United States Patent
Yang

(10) Patent No.: US 7,479,091 B2
(45) Date of Patent: Jan. 20, 2009

(54) ENGINE RUNNING AT FIXED SPEED INCORPORATED CONTROLLABLE TRANSMISSION POWER SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 118 days.

(21) Appl. No.: 11/203,179

(22) Filed: Aug. 15, 2005

(65) Prior Publication Data
US 2007/0037661 A1   Feb. 15, 2007

(51) Int. Cl.
*B60W 10/04* (2006.01)
(52) U.S. Cl. .................... 477/108; 477/111; 477/115
(58) Field of Classification Search .............. None
See application file for complete search history.

(56) References Cited
U.S. PATENT DOCUMENTS

| | | | | |
|---|---|---|---|---|
| 6,416,441 B1 * | 7/2002 | Eckert et al. | ............ | 477/185 |
| 6,565,481 B2 * | 5/2003 | Toukura et al. | ............ | 477/107 |
| 6,666,793 B2 * | 12/2003 | Narita et al. | ............ | 477/40 |
| 2001/0016538 A1 * | 8/2001 | Saito et al. | ............ | 477/111 |
| 2004/0023755 A1 * | 2/2004 | Nozaki | ............ | 477/45 |

\* cited by examiner

*Primary Examiner*—David D. Le
(74) *Attorney, Agent, or Firm*—Rabin & Berdo, P.C.

(57) ABSTRACT

A power system of controllable transmission incorporated with an engine running at fixed speed that controls the engine to run at a fixed speed or approaching a fixed speed within an rpm range with higher BSFC (braking specific fuel consumption) when the engine is started up from static status and in the accelerated drive from low rpm, the output end of the engine drives to achieve active control of the controllable front-end gearbox that is capable of executing variable or invariable gear shift so to activate the output end to execute accelerated drive output from low to high rpm; meanwhile, in the course of start-up and acceleration from lower to high rpm and in driving operation, the engine runs in an rpm range with higher BSFC for saving fuel.

18 Claims, 16 Drawing Sheets

| Function \ System Components | Start-Low Speed-Medium Speed Drive | Medium Speed-High Speed Drive | Reversing | Engine Braking | Standby |
|---|---|---|---|---|---|
| Engine 100 | Engine starts → running at or approximately at a fixed speed to operate within the rpm range of better BSFC efficiency. | Engine is accelerating | Engine starts → running at or approximately at a fixed speed to operate within the rpm range of better BSFC efficiency. | Engine Decelerates or Stops | Engine idling at low RPM or stopped |
| Manual Operation Interface 104 and Drive Control Interface 105 in Active Operation Status | Stop → Low Speed Section → Medium Speed Section | Medium Speed Section → High Speed Section | Stop → Low Speed Section → Medium Speed Section → High Speed Section | High Speed Section → Medium Speed Section → Low Speed Section → Stop | Stopped |
| Clutch 101 | Closed | Closed | Closed | Closed | Released |
| Output RPM of the Controllable Front End Gearbox 102 subject to Control by the Active Control Device 1020 | No Output → Output at Low Speed → Output at Medium Speed | Output at High Speed | No Output → Output at Low Speed → Output at Medium → Output at High Speed | Output at High Speed → Output at Low Speed or Stops | Stopped |
| Rear End Output Gearbox 1033 (Optional) | To be selected with a fixed speed ratio or not provided | To be selected with a fixed speed ratio or not provided | As Elected, Reserves Shift may be Provided, or Having the Reverse Shift Disposed to the Controllable Front End Gearbox 102 | To be selected with a fixed speed ratio or not provided | |

FIG 5

| System Components \ Function | Start-Low Speed-Medium Speed Drive | Medium Speed-High Speed Drive | Reversing | Engine Braking | Standby |
|---|---|---|---|---|---|
| Engine 100 | Engine starts → running at or approximately at a fixed speed to operate within the rpm range of better BSFC efficiency. | Engine is accelerating | Engine starts → running at or approximately at a fixed speed to operate within the rpm range of better BSFC efficiency. | Engine Decelerates or Stops | Engine idling at low RPM or stopped |
| Manual Operation Interface 104 and Drive Control Interface in Active Operation Status | Stop → Low Speed Section → Medium Speed Section | Medium Speed Section → High Speed Section | Stop → Low Speed Section → Medium Speed Section → High Speed Section | High Speed Section → Medium Speed Section → Low Speed Section → Stop | Stopped |
| Clutch 101 | Closed | Closed | Closed | Closed | Released |
| Output of the Controllable Front End Gearbox 102 subject to Control by the Active Control Device 1020 | No Output → Output at Low Speed → Output at Medium Speed | Output at High Speed | No Output → Output at Low Speed → Output at Medium → Output at High Speed | Output at High Speed → Output at Medium → Output at Low Speed or Stops | Stopped |
| Rear End Output Gearbox 1035 | Output at Low Speed → Output at Medium Speed | Output at High Speed | Reverse Shift | Output at High Speed → Output at Low Speed or Stops | Stopped |

FIG 7

| Function / System Components | Start-Low Speed-Medium Speed Drive | Medium Speed-High Speed Drive | Reversing | Engine Braking | Standby |
|---|---|---|---|---|---|
| Engine 100 | Engine starts → running at or approximately at a fixed speed to operate within the rpm range of better BSFC efficiency. | Engine is accelerating | Engine starts → running at or approximately at a fixed speed to operate within the rpm range of better BSFC efficiency. | Engine Decelerates or Stops | Engine idling at low RPM or stopped |
| Manual Operation Interface 104 and Drive Control Interface in Active Operation Status | Stop → Low Speed Section → Medium Speed Section | Medium Speed Section → High Speed Section | Stop → Low Speed Section → Medium Speed Section | High Speed Section → Medium Speed Section → Low Speed Section → Stop | Stopped |
| Clutch 101 | Closed | Closed | Closed | Closed | Released |
| Output RPM of the Controllable Front End Gearbox 102 subject to Control by the Active Control Device 1020 | No Output → Output at Low Speed → Output at Medium Speed | Output at High Speed | No Output → Output at Low Speed → Output at Medium → Output at High Speed | Output at High Speed → Output at Medium → Output at Low Speed or Stops | Stopped |
| Rear End Output Gearbox 1037 | Output at Low Speed → Output at Medium Speed | Output at High Speed | Reverse Shift | Output at High Speed → Output at Low Speed or Stops | Stopped |

FIG 9

ENGINE RUNNING AT FIXED SPEED INCORPORATED CONTROLLABLE TRANSMISSION POWER SYSTEM

BACKGROUND OF THE INVENTION (a) Field of the Invention

The engine running at fixed speed that is incorporated with a controllable transmission power system of the present invention relates to a power system to control the engine for running at a fixed speed or at an approximately fixed speed within an rpm area present with comparatively higher BSFC during the process of starting up against the load and the driving from start-up to accelerate; wherein, the output end of the engine drives the controllable front-end transmission that provides active control for step or tension variable transmission to start up the output end of the engine and to exercise accelerated output from low rpm to high rpm, thus for the engine to operate within an rpm area of comparatively higher BSFC for saving fuel in the course of starting up the engine against the load, the process of acceleration from low rpm to high rpm, and in the subsequent driving operation.

(b) Description of the Prior Art

A conventional engine is usually incorporated with a controllable variable or invariable speed means at its end to output mechanical kinetics by revolution in the formation of a power system for driving a load, e.g., a motor car, sea vessel or other mechanical equipment by providing the outputs at various rpm, and torque needed by the load to start and accelerate to its maximal rpm;

In the conventional engine power train as described above, the throttle operation controls the acceleration of the engine in conjunction with a gear ratio controllable step or tension variable transmission, or an automatic transmission to drive the load. That is, the load is started and then to engage in acceleration by changing the engine rpm and the controllable gear ratio. Since the engine has to gradually accelerate from lower rpm to higher rpm, the BSFC efficiency of the engine is very poor while the engine is running within the range of the lower rpm up to the higher rpm, the pollution to the environment also increases from fuel consumption when the engine is running at low to medium rpm during start-up, acceleration, or the car is driving in downtown or during peak hours.

Fuel consumption per kW significantly varies depending on the rpm and torque output of the running engine. Taking the Brake Specific Fuel Consumption (BSFC) efficiency of a conventional internal combustion engine as illustrated in FIG. 1 of the accompanying drawings as an example, it is found that the fuel consumption respectively marked for each concentric range that maintaining the engine to run within the rpm range of higher BSFC as applicable helps effectively save fuel consumption.

SUMMARY OF THE INVENTION

The primary purpose of the present invention is to provide a controllable transmission power system incorporated with an engine running at fixed speed to control the engine to run at or approximately at fixed speed within the rpm range of higher BSFC efficiency. The output end of the engine drives a controllable transmission that provides active control for step or tension variable transmission thus to start up the output end and to accelerate the drive output; accordingly, the engine is allowed to run within the transmission region of higher BSFC efficiency to save fuel in the course of starting and accelerating to drive.

BRIEF DESCRIPTION OF THE DRAWINGS

FIG. 5 is a list showing the operational functions of control through the manual operation interface and control drive interface devices by the first preferred embodiment of the present invention as illustrated in FIG. 4.

FIG. 7 is a view showing that the second preferred embodiment is adapted with the manual interface and the drive control interface as shown in FIG. 6.

FIG. 9 is a view showing that the third preferred embodiment is adapted with the manual interface and the drive control interface as shown in FIG. 8.

DETAILED DESCRIPTION OF THE PREFERRED EMBODIMENTS

Figure 1:
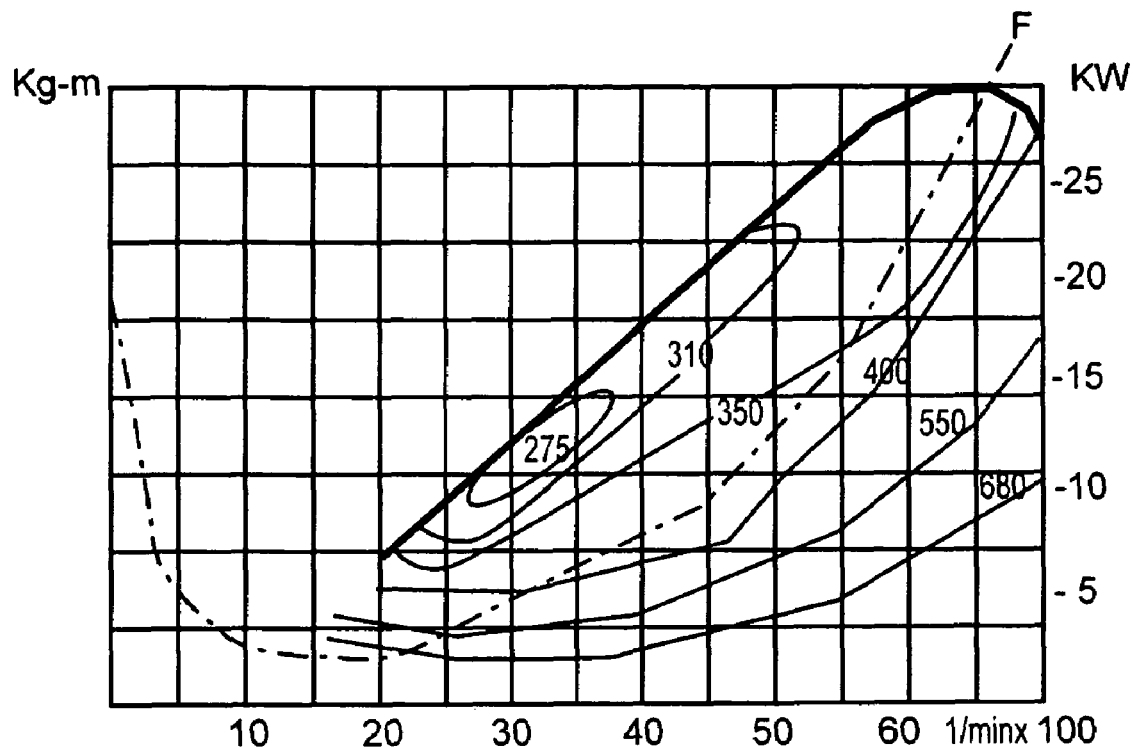
FIG. 1 shows an example of BSFC of a conventional internal combustion engine.
Figure 2:
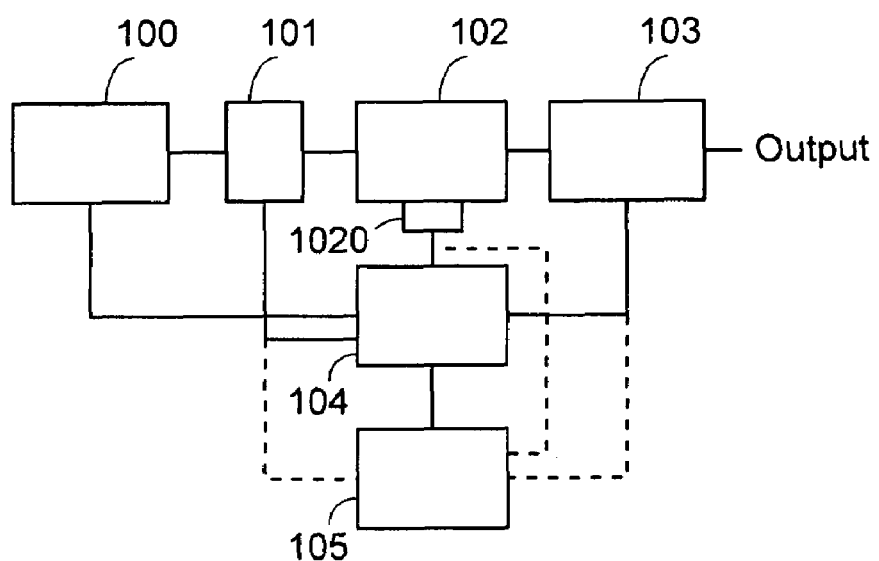
FIG. 2 is a block chart showing a basic configuration of the present invention.

A power system of controllable transmission incorporated with an engine running at fixed speed of the present invention provides better BSFC efficiency in the course of engine start-up and acceleration or revolution at medium or lower rpm after the ignition of an internal combustion engine and the engine is running at fixed speed. To achieve the purpose, a front-end gearbox that provides active control of step or tension transmission and a rear-end gearbox may be optionally adapted to the power system. The engine running at fixed speed that is incorporated with a controllable transmission power system of the present invention relates to a power system to control the engine for running at a fixed speed or at an approximately fixed speed within an rpm area present with comparatively higher BSFC during the process of starting up against the load and the driving from start-up to accelerate; wherein, the output end of the engine drives the controllable front-end transmission that provides active control for step or tension variable transmission to start up the output end of the engine and to exercise accelerated output from low rpm to high rpm, thus for the engine to operate within an rpm area of comparatively higher BSFC for saving fuel in the course of starting up the engine against the load, the process of acceleration from low rpm to high rpm, and in the subsequent driving operation. The power system of controllable transmission incorporated with an engine running at fixed speed of the present invention is described in details as follows:

Referring to FIG. 2 for a block chart showing a basic configuration of the present invention, the present invention is essentially comprised of:

an engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

a clutch 101: relates to an optional item of a clutching device driven by manual, mechanical, electromagnetic, fluid, or eccentric force, or related to a one-way transmission to be disposed between the output side of the engine 100 and a controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket, fluidity, electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

the active control device 1020: an optional device related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

a rear-end gearbox 103: an optional item related to a gearbox with fixed transmission ratio, a step gear shift operated by manual, or a step or tension automatic gearbox, or a step or tension gearbox of microprocessor controlled automatic gear shift, including gear, friction gear, pulley, sprocket, electromagnetic transmission, or any other prior art of transmission, and to execute reverse output for reverse gear, the output of the rear-end gearbox may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;

a manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020 the controllable front-end gearbox 102, and the rear-end output gearbox 103 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism.

Figure 3:
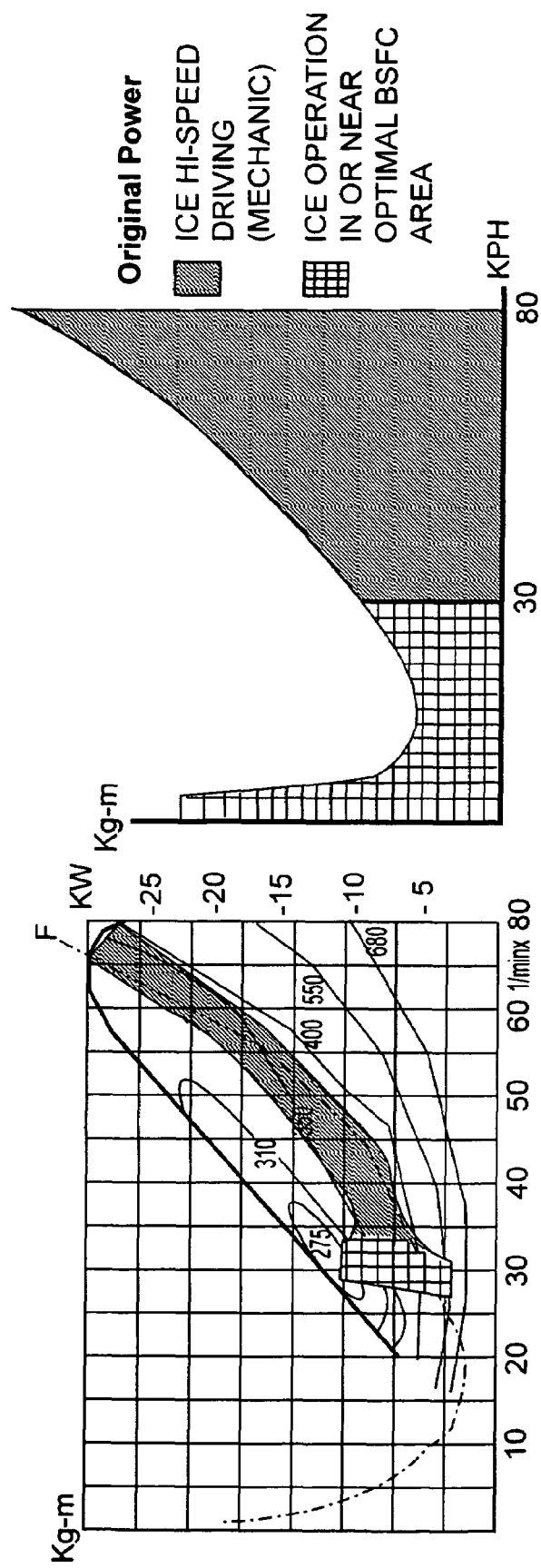
FIG. 3 is a chart showing the BSFC characteristics of the present invention.

The power system as described above upon starting the engine 100 provides better BSFC efficiency by having the engine 100 to run at or approximately at fixed speed within the range of higher rpm and executing the active control the optional controllable front-end gearbox to output from lower rpm and higher rpm. Furthermore, when the output from controllable front-end gearbox 102 reaches a preset rpm or torque, the engine 100 engages in the variable operation within a range of comparatively higher rpm through the control by the manual operation interface 104, and the manual operation interface 104 is controlled by the drive interface device 105 so to increase rpm or torque; meanwhile, the controllable front-end gearbox 102 is directly subject to the control by the manual operation interface 104 or through the control by the active control device 1020 to make the output of relatively variable speed ratio; if the system is provided with a rear-end output gearbox 103, the output of relatively variable speed ratio is made by means of controlling the speed ratio of the rear-end output gearbox 103. FIG. 3 shows the BSFC efficiency of the present invention.

Figure 4:
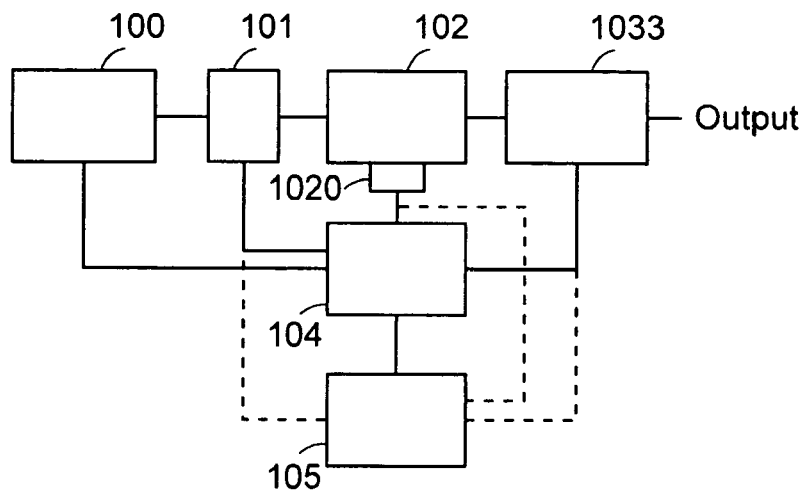
FIG. 4 is a system block chart of a first preferred embodiment of the present invention.

Referring to FIG. 4 for a system block chart of a first preferred embodiment of the present invention, the preferred embodiment is essentially comprised of:

the engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluid, or eccentric force, or related to a one-way transmission to be disposed between the output side of the engine 100 and a controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket, fluidity, or electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

the active control device 1020: an optional device related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

a rear-end output gearbox 1033: an optional item comprised of a transmission of fixed transmission ratio, speed increase or reduction as required, and an inverse output for inverse gear function may be adapted as required to output for driving a load, or driving two loads that engage in differential operation as driven through a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, and the controllable front-end gearbox 102 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism.

FIG. 5 is a view showing that the first preferred embodiment as illustrated in FIG. 4 is adapted with a manual interface 104 and a drive control interface 105. The first preferred embodiment provides all or a part of the following functions:

(1) Stand-by function: the engine 100 may be killed or idling at low speed, the clutch 101 if provided is in released status; and the controllable front-end gearbox 102 is at its Stop position;

(2) Start→Low Speed→Medium Speed Drive function: the engine 100 runs at or approximately at a fixed speed to operate within the rpm range of better BSFC efficiency, the clutch 101 if provided is in its closed status, and the controllable front-end gearbox 102 produces output from low rpm accelerated to medium rpm to drive a load through the active control via the manual control interface 104 or indirectly by means of the drive control interface 105;

(3) Medium Speed→High Speed or Greater Torque Drive function: If the system requires drive output function at higher speed or greater torque, the engine 100 engages in the variable operation within a range of comparatively higher rpm through the control by the manual operation interface 104, and the manual operation interface 104 is controlled by the drive interface device 105 so to increase rpm or torque; meanwhile, the controllable front-end gearbox 102 is directly subject to the control by the manual operation interface 104 or through the control by the active control device 1020 to make the output of relatively variable speed ratio when the output from controllable front-end gearbox 102 reaches a preset rpm or torque; if the system is provided with a rear-end output gearbox 103, the output of relatively variable speed ratio is made by means of controlling the speed ratio of the rear-end output gearbox 103;

(4) Engine Braking function: an optional function, wherein, the engine 100 speed is reduced by the operating the manual operation interface 104 and the drive control interface 105, the clutch 101 if provided is in its closed status, and the inertia kinetics from the load side is transmitted in reverse back to the engine 100 for the engine 100 to execute braking by internal friction; and (5) Reverse Gear function: an optional function the engine 100 runs at or approximately at a fixed speed to operate within the rpm range of better BSFC efficiency, the clutch 101 if provided is in its closed status, and the controllable front-end gearbox 102 engages in reverse drive by operating the manual operation interface 104; the reverse operation may be related to a transmission provided with reverse gear to be disposed at the output end or to the controllable front-end gearbox 102 that is controllable to engage in reverse output.

Figure 6:
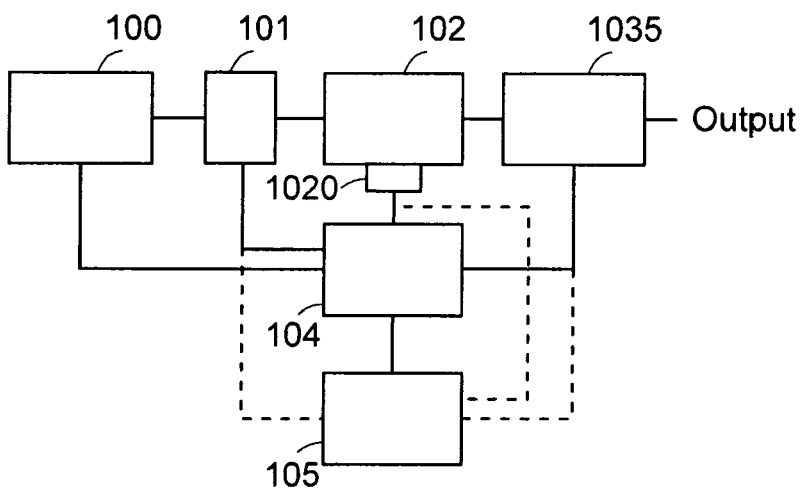
FIG. 6 is a system block chart of a second preferred embodiment of the present invention.

FIG. 6 is a system block chart of a second preferred embodiment of the present invention. The second preferred embodiment is essentially comprised of:

the engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluid, or eccentric force, or related to a one-way transmission to be disposed between the output side of the engine 100 and a controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket, fluidity, or electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

an active control device 1020: an optional device related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

a rear-end output gearbox 1035: an optional device related to a manual gearbox provided with step gear shift function, or a manual step provided with step automatic transmission function, or a gearbox provided with tension function directly operated by manual to output for driving a load, or driving two loads that engage in differential operation through a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, and the rear-end output gearbox 1035 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism.

FIG. 7 a view showing that the second preferred embodiment is adapted with the manual interface 104 and the drive control interface 105 as shown in FIG. 6. The second preferred embodiment provides all or a part of the following functions:

(1) Stand-by function: the engine 100 may be killed or idling at low speed, the clutch 101 if provided is in released status;

and the controllable front-end gearbox 102 is at its Stop position;

(2) Start→Low Speed→Medium Speed Drive function: the engine 100 runs at or approximately at a fixed speed to operate within the rpm range of better BSFC efficiency, the clutch 101 if provided is in its closed status, and the controllable front-end gearbox 102 produces output from low rpm accelerated to medium rpm to drive a load through the active control via the manual control interface 104 or indirectly by means of the drive control interface 105, and further to drive a load through the rear-end output gearbox 1035 comprised of a gearbox provided with manual step gear shift, or manual automatic transmission step gear shift, or manual tension function;

(3) Medium Speed→High Speed Drive function: if the system is provided with the function of high speed drive output, the engine 100 is accelerated from medium speed up to high speed to drive a load through the operation of the manual operation interface 104 and the operation of the drive control interface 105, and further to drive a load through the rear-end output gearbox 1035 comprised of a gearbox provided with manual step gear shift, or manual automatic transmission step gear shift, or manual tension function;

(4) Engine Braking function: the engine 100 speed is reduced by the operating the manual operation interface 104 and the drive control interface 105, the clutch 101 if provided is in its closed status, and the inertia kinetics from the load side is transmitted in reverse back to the engine 100 for the engine 100 to execute braking by internal friction; and (5) Reverse Gear function: the engine 100 runs at or approximately at a fixed speed to operate within the rpm range of better BSFC efficiency, the clutch 101 if provided is in its closed status, and the controllable front-end gearbox 102 engages in reverse drive by operating the manual operation interface 104; the reverse operation may be related to a transmission provided with reverse gear to be disposed at the output end or to the controllable front-end gearbox 102 or the rear-end output gearbox 1035 that is controllable to engage in reverse output.

Figure 8:
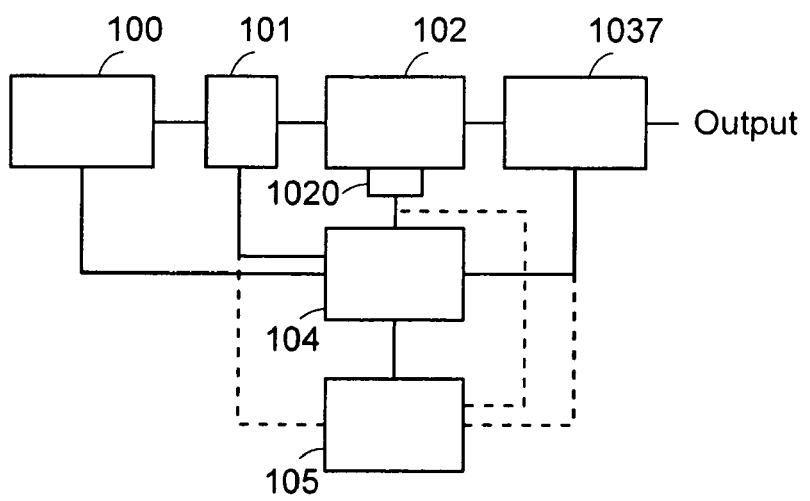
FIG. 8 is a system block chart of a third preferred embodiment of the present invention.

FIG. 8 is a system block chart of a third preferred embodiment of the present invention. The third preferred embodiment of the present invention is essentially comprised of:

the engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluid, or eccentric force, or related to a one-way transmission to be disposed between the output side of the engine 100 and a controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket fluidity, or electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

an active control device 1020: an optional device related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

a rear-end gearbox 1037: an optional device related to a microprocessor controlled or other automatic transmission operated step or tension gearbox to output for driving a load, or driving two loads that engage in differential operation through a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, and the rear-end output gearbox 1037 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism.

FIG. 9 is a view showing that the third preferred embodiment is adapted with the manual interface 104 and the drive control interface 105 as shown in FIG. 8. The third preferred embodiment provides all or a part of the following functions:

(1) Standby: Stand-by function: the engine 100 may be killed or idling at low speed, the clutch 101 if provided is in released status; and the controllable front-end gearbox 102 is at its Stop position;

(2). Start→Low Speed→Medium Speed Drive function: the engine 100 runs at or approximately at a fixed speed to operate within the rpm range of better BSFC efficiency, the clutch 101 if provided is in its closed status, and the controllable front-end gearbox 102 produces output from low rpm accelerated to medium rpm to drive a load through the active control via the manual control interface 104 or indirectly by means of the drive control interface 105; and further to drive a load through the rear-end output gearbox 1037 comprised of a gearbox provided with manual step gear shift, or manual automatic transmission step gear shift, or manual tension function;

(3) Medium Speed→High Speed Drive function: if the system is provided with the function of high speed drive output, the engine 100 is accelerated from medium speed up to high speed to drive a load through the operation of the manual operation interface 104 and the operation of the drive control interface 105, and further to drive a load through the rear-end output gearbox 1037 comprised of a gearbox provided with manual step gear shift, or manual automatic transmission step gear shift, or manual tension function;

(4) Engine Braking function: the engine 100 speed is reduced by the operating the manual operation interface 104 and the drive control interface 105, the clutch 101 if provided is in its closed status, and the inertia kinetics from the load side is transmitted in reverse back to the engine 100 for the engine 100 to execute braking by internal friction; and (5) Reverse Gear function: the engine 100 runs at or approximately at a fixed speed to operate within the rpm range of better BSFC efficiency, the clutch 101 if provided is in its closed status, and the controllable front-end gearbox 102 engages in reverse drive by operating the manual operation interface 104; the reverse operation may be related to a transmission provided with reverse gear to be disposed at the output end or to the controllable front-end gearbox 102 that is controllable to engage in reverse output.

The power system of the present invention is further incorporated with the engine power system applied in the engine Stop & Go Function.

Figure 10:
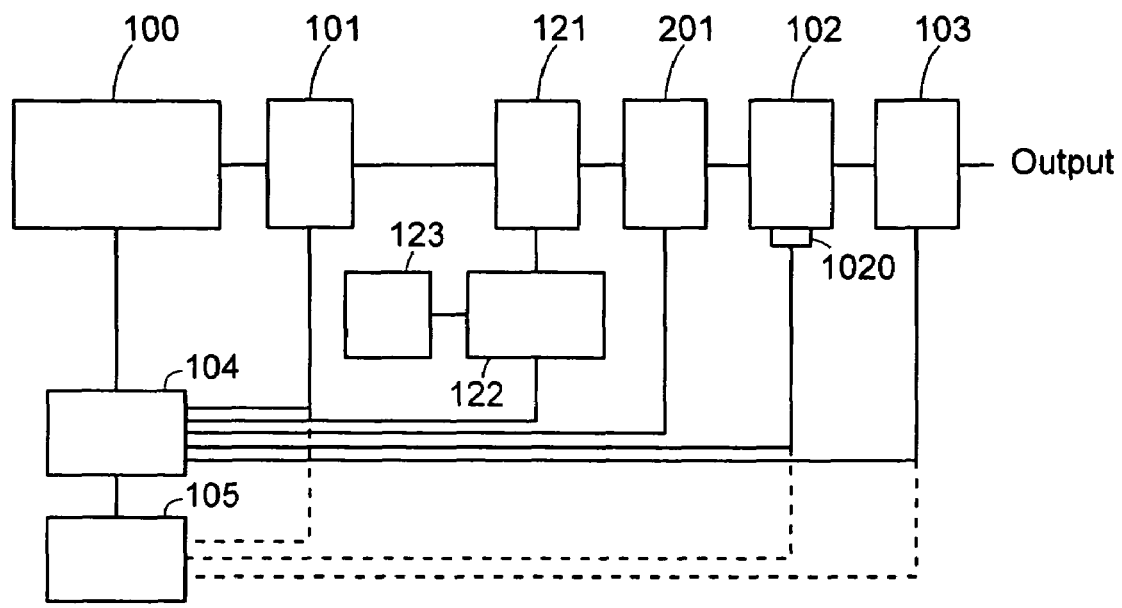
FIG. 10 is a block chart of the present invention incorporated in series with a revolving electric machine provided with functions as motor and a generator applied in a power system of engine Stop & Go Function.

FIG. 10 is a block chart of the present invention incorporated in series with a revolving motor provided with functions as motor and a generator applied in a power system of engine Stop & Go function. Wherein, the present invention is essentially comprised of:

the engine 100 relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutches 101, 201: each relates to an optional item of a clutching device driven by manual, mechanical, electromagnetic, fluid, or eccentric force; the clutch 101 is disposed at where between the output side of the engine 100 and the revolving electric machine 121 functioning as a series motor and generator, and the clutch 201 is disposed at where between the revolving electric machine 121 functioning as a series motor and generator and the and the controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket fluidity, electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

the active control device 1020: an optional item related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

the rear-end gearbox 103: an optional item related to a gearbox with fixed transmission ratio, a step gear shift operated by manual, or a step or tension automatic gearbox, or a step or tension gearbox of microprocessor controlled automatic gear shift, including gear, friction gear, pulley, sprocket, fluidity, electromagnetic transmission, or any other prior art of transmission, and to execute reverse output for reverse gear, the output of the rear-end gearbox may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the clutch 201, the controllable front-end gearbox 102, the active control device 1020, and the rear-end output gearbox 103 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, the clutch 201 or the active control device 1020 of the controllable front-end gearbox 102 to engage in the operation of related mechanism.

a revolving electric machine 121 connected in series and provided with functions as a motor and a generator: related to a dual-end shaft revolving electric machine comprised of AC or DC, brush or brushless, synchronous or asynchronous revolving electric machine with the shafts at both ends connected in series to where between the clutch 101 and the controllable front-end gearbox 102 for the active control to provide the following functions:

(1) When the revolving machine 121 is driven to operate as a generator, it recharges a battery 123 or supplies power to other loads driven by electric energy through a circuit control device 122; at this time, the clutch 101 is closed, and the clutch 201 may be closed or released as applicable, and (2) When driven by the power from the batter 123 through a circuit control device 122 to operate as a motor, the revolving electric machine 121 connected in series and provided with functions as a motor and a generator starts up an engine or drives other mechanical force to drive a load; at this time, the clutch 101 is closed, and the clutch 201 may be closed or released as applicable.

the circuit control device 122: related to a dynamo-electric device or electronic device subject to the control by the manual operation interface 104 and the drive control interface 105 so to further control the power in the battery 123, drive the revolving electric machine 121 connected in series and provided with functions of a motor and a generator to operate as a motor, and control features of amperage, voltage, rpm, revolving direction, and torque when the revolving electric machine 121 is operating as a motor; or when the revolving electric machine 121 connected in series and provided with functions of a motor and a generator operates as a generator, to control the power generated from the revolving electric machine 121, voltage, amperage, timing and automatic cut-off upon saturation in charging the battery 123; and the battery 123: comprised of any type of rechargeable battery, capacitor, or super-capacitors to store or discharge electric power.

Figure 11:
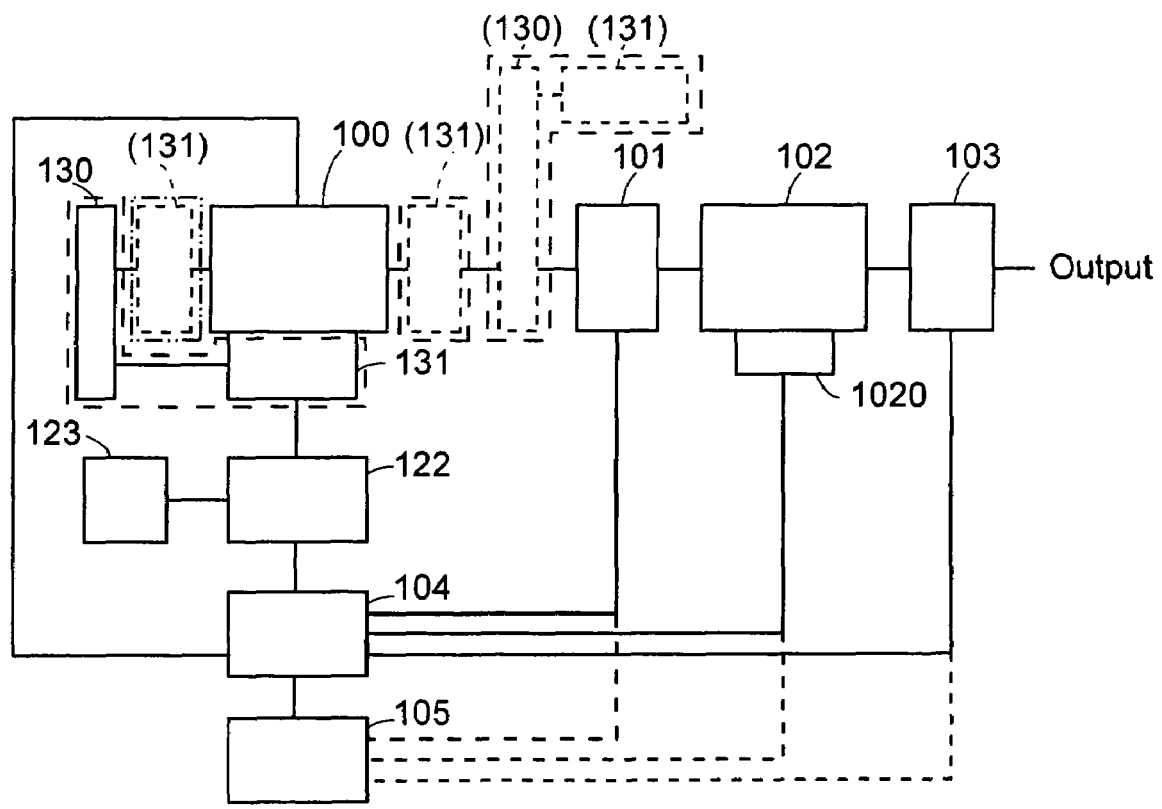
FIG. 11 is a block chart of the present invention incorporated with the electric machine integrated with the functions of a motor and a generator applied in a power system of engine Stop & Go Function.

FIG. 11 is a block chart of the present invention incorporated with the electric machine integrated with the functions of a motor and a generator applied in a power system of engine Stop & Go Function. Wherein, the present invention is essentially comprised of:

the engine 100 relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluid, or eccentric force, or related to a one-way transmission to be disposed between the output side of the engine 100 and a controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, sprocket fluidity, electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

the active control device 1020: an optional device related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

the rear-end gearbox 103: an optional item related to a gearbox with fixed transmission ratio, a step gear shift operated by manual, or a step or tension automatic gearbox, or a step or tension gearbox of microprocessor controlled automatic gear shift, including gear, friction gear, pulley, sprocket, fluidity, electromagnetic transmission, or any other prior art of transmission, and to execute reverse output for reverse gear, the output of the rear-end gearbox may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, and the rear-end output gearbox 103 for outputting to drive the load; and the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism;

an electric machine 131 integrated with the functions of a motor and a generator: related to a revolving electric machine comprised of AC or DC, brush or brushless, synchronous or asynchronous revolving electric machine with its revolving shaft may be directly coupled to the front end or the rear rend of the shaft of the engine 100, or to engage in transmission mutually with the shaft of the engine 100 by means of a transmission assembly 130 to provide the following functions:

(1) When the electric machine 131 integrated with the functions of a motor and a generator, it recharges a battery 123 or supplies power to other loads driven by electric energy through a circuit control device 122; and (2) The power from the battery 123 controls through the control circuit device 122 to drive the electric machine 131 integrated with the functions of a motor and a generator to operate as a motor to start up the engine or drive a load;

the control circuit device 122: related to a dynamo-electric device or electronic device subject to the control by the manual operation interface 104 and the drive control interface 105;

the battery 123: comprised of any type of rechargeable battery, capacitor, or super-capacitors to store or discharge electric power; and the transmission assembly 130: an optional item comprised of a shaft-to-shaft coupler, or gear, friction gear, pulley, serrated pulley, sprocket, fluidity, electromagnetic, or any other prior art of transmission; or when required, an optional item of a controllable clutch subject to the control by the control circuit device 122 is disposed between the shaft of the engine 100, and the rotation part of the electric machine 131 integrated with the functions of a motor and a generator so to control the operation of the transmission between the shaft of the engine 100, and the rotation part of the electric machine 131 integrated with the functions of a motor and a generator;

The electric machine 131 integrated with the functions of a motor and a generator may be comprised of a conventional motor and a generator if and when required. Transmission between the individual motor and the generator and the shaft of the engine 100 and the optional item of the transmission in the transmission assembly 130 are similar to that described above, and their operating functions in the system are the same as that provided by the electric machine 131 integrated with the functions of a motor and a generator.

The power system provided with the immediate Stop and Go Function of the present invention is controlled through the manual operation interface 104 and the drive interface device 105 with its operation mechanism characterized as follows:

(1) Provide immediate operation of Stop & Co Function. When the load stops, the engine stop running; upon starting up, the power from the battery 123 drives the electric machine 131 integrated with the functions of a motor and a generator to operate as a motor for starting up the engine or driving the load in time, and controlling features of amperage, voltage, rpm, revolving direction, and torque;

(2) Once started, the engine maintains running at a fixed speed or at a speed approaching a fixed speed within the area with comparatively higher BSFC; the controllable front-end gearbox 102 is controlled by the manual operation interface 104 through the drive interface device 105 and then through the active control device 1020, or is directly controlled by the drive interface device 105 for the output from the controllable front-end gearbox 102 to engage in relatively faster or slower operation;

(3) Provide an optional function. When the output from controllable front-end gearbox 102 reaches a preset rpm or torque, the engine 100 engages in the variable operation within a range of comparatively higher rpm through the control by the manual operation interface 104, and the manual operation interface 104 is controlled by the drive interface device 105 so to increase rpm or torque; meanwhile, the controllable front-end gearbox 102 is directly subject to the control by the manual operation interface 104 or through the control by the active control device 1020 to make the output of relatively variable speed ratio; if the system is provided with a rear-end output gearbox 103, the output of relatively variable speed ratio is made by means of controlling the speed ratio of the rear-end output gearbox 103;

(4) To control the charging voltage, amperage, timing to start charging, and automatic cut-off upon the charging is saturated on the battery 123 with power generated from the electric machine 131 integrated with the functions of a motor and a generator when the electric machine 131 integrated with the functions of a motor and a generator is operating as a generator; and (5) During the process of deceleration, driving on down slope, or applying a brake, the electric machine 131 integrated with the functions of a motor and a generator is drawn to operate as a generator to supply power to the battery 123 or any other power driven load to produce braking damper. This function is an optional function.

The power system of the present invention may be further applied in a multiple output power train to drive a load; and is essentially comprised of a single engine to drive multiple output power trains that provide active control over the variable output, thus to drive the load assigned to each output power train.

Figure 12:
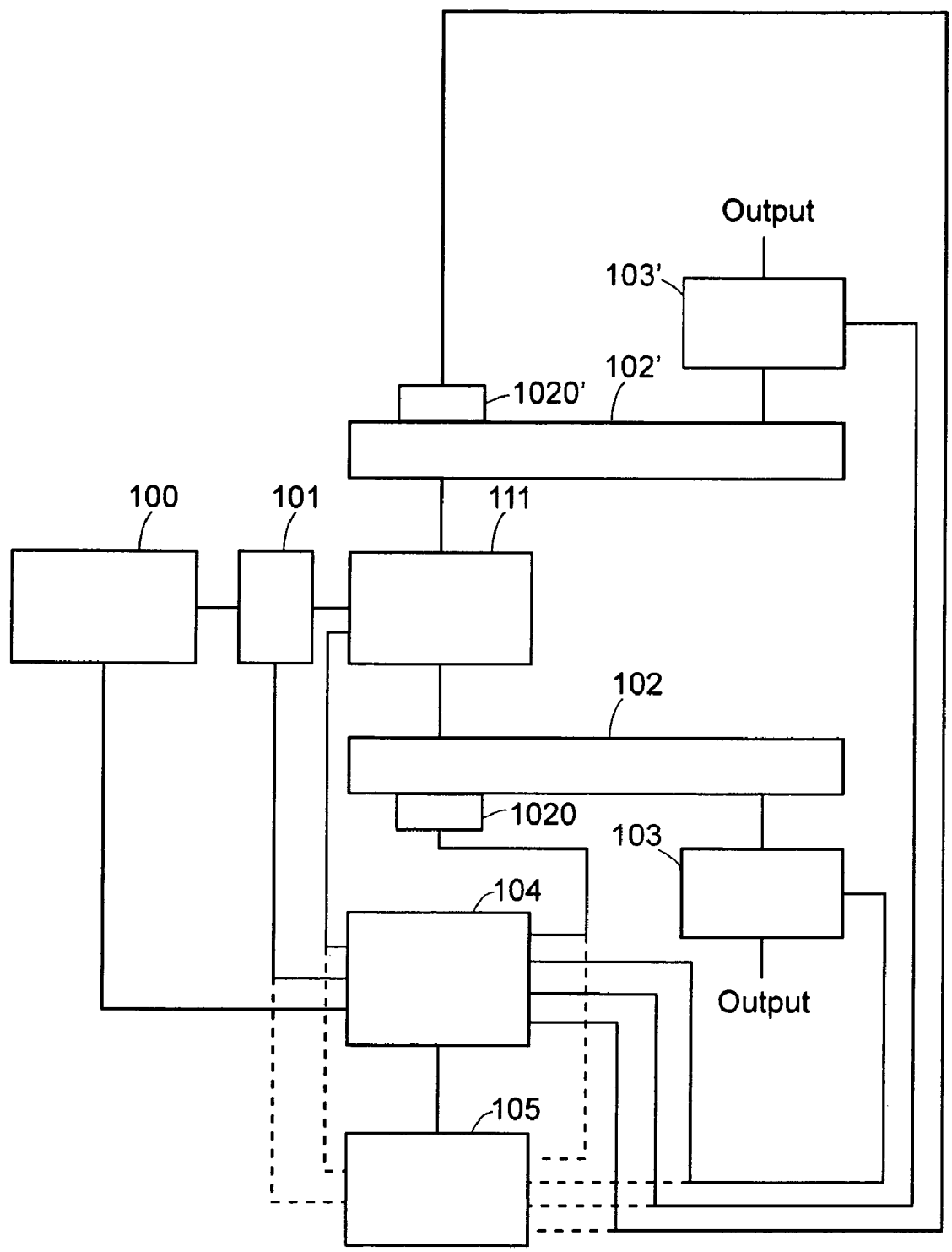
FIG. 12 is a system block chart of the present invention that provides multiple power trains.

FIG. 12 is a system block chart of the present invention that provides multiple power trains. The fourth preferred embodiment is essentially comprised of:

the engine 100 relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluidity, or eccentric force, or related to a one-way transmission to be disposed between the output side of the engine 100 and a power distribution device 111;

two controllable front-end gearboxes 102, 102': respectively driven by two output ends of a power allotment device 111; wherein the controllable front-end gearbox 102 is provided with the active control device 1020 to directly execute active control, or indirectly through the drive control interface 105 to engage in relative change in transmission ratio for manual step gear shift, manual step automatic transmission, or step or tension automatic transmission gearbox, or for automatic transmission control of step or tension gearbox by microprocessor; the controllable front-end gearbox 102 includes a transmission driven by gear, friction gear, pulley, sprocket fluidity, electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

The controllable front-end gearbox 102' is provided with an active control device 1020' to directly execute active control, or indirectly through the drive control interface 105 to engage in relative change in transmission ratio for manual step gear shift, manual step automatic transmission, or step or tension automatic transmission gearbox, or for automatic transmission control of step or tension gearbox by microprocessor; the controllable front-end gearbox 102 includes a transmission driven by gear, friction gear, pulley, sprocket, fluidity, electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

two active control devices 1020, 1020': both are optional items, the active control device 1020 is related to a physical structure that produces activated displacement when driven by a mechanical structure, electro-mechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio; and another control device 1020' related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102' to engage in relative change in transmission ratio.

two rear-end output gearboxes 103, 103': optional items, each is related to a gearbox with fixed transmission ratio, a step gear shift operated by manual, or a step or tension automatic gearbox, or a step or tension gearbox of microprocessor controlled automatic gear shift, including gear, friction gear, pulley, sprocket, fluidity, electromagnetic transmission, or any other prior art of transmission, and to execute reverse output for reverse gear, the output of the rear-end gearbox 103 may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set; and the output from another rear-end gearbox 103' may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, 102', and the rear-end output gearbox 103, 103' for outputting to drive the load;

the drive control interface 105: an optional item comprised of a mechanical device, electromechanical device, electronic device or a microprocessor and related software for receiving the transmission operation of the manual operation interface 104, or electric, radio wave, photo or audio signals to control those peripherals related to the operation status of the engine 100, the clutch 101, or the active control device 1020, 1020' of the controllable front-end gearbox 102, 102' to engage in the operation of related mechanism; and the power allotment device 111: to input from its input end revolving kinetics transmitted from the engine 100 by the clutch 101, and to output those revolving kinetics from its both output ends; may be further provided with clutch function, variable transmission ratio, differential operation between at least two output ends, torque control, or torque limitation to control its incoming and outgoing revolving kinetics;

said power allotment device 111 may be subject to the control by the manual operation interface 104 or the drive control interface 105; one end of both output ends of the power allotment device 111 is provided for outputting the corresponding controllable front-end gearbox 102, and further to respectively drive the adapted rear-end output gearbox 103 at the output end of the controllable front-end gearbox 102; therefore, the controllable front-end gearbox 102 is subject to the control by the adapted active control device 1020, which is either directly subject to the active control by the manual operation interface 104, or indirectly subject to the active control by the drive control interface 105 to execute the active control over the transmission ratio of the controllable front-end gearbox 102;

another end of both output ends of the power allotment device 111 is provided for outputting the corresponding controllable front-end gearbox 102', and further to respectively drive the adapted rear-end output gearbox 103' at the output end of the controllable front-end gearbox 102'; therefore, the controllable front-end gearbox 102' is subject to the control by the adapted active control device 1020', which is either directly subject to the active control by the manual operation interface 104', or indirectly subject to the active control by the drive control interface 105' to execute the active control over the transmission ratio of the controllable front-end gearbox 102';

As required, two or more than two revolving output ends may be disposed at the output end of the power allotment device 111.

The multiple output power trains may be provided in two or more than two sets for executing multiple-wheel drive, e.g., to drive vehicles with four or more than four wheels, or to drove tracked vehicle or any other load that requires driving multiple units.

To promote efficiency and reduce normal tear and wear of the controllable front-end gearbox 102, a controllable clutch 201 is disposed at where between the input and the output ends of the controllable front-end gearbox 102. When the controllable gearbox 102 is closed, both of its input and output ends indicate direct coupling for transmission to reduce transmission loss.

Alternatively, the controllable clutch 201 may be disposed inside or outside the controllable front-end gearbox. By having a gearbox 108 to function as the transmission between the input end of the controllable front-end gearbox 102 and the input end of the controllable clutch 201, and having another gearbox 109 as the transmission between the output end of the controllable front-end gearbox 102 and the output end of the controllable clutch 201, both of the input and the out ends of the controllable front-end gearbox 102 execute directly coupled transmission through the controllable clutch 201 when closed to reduce transmission loss.

Figure 13:
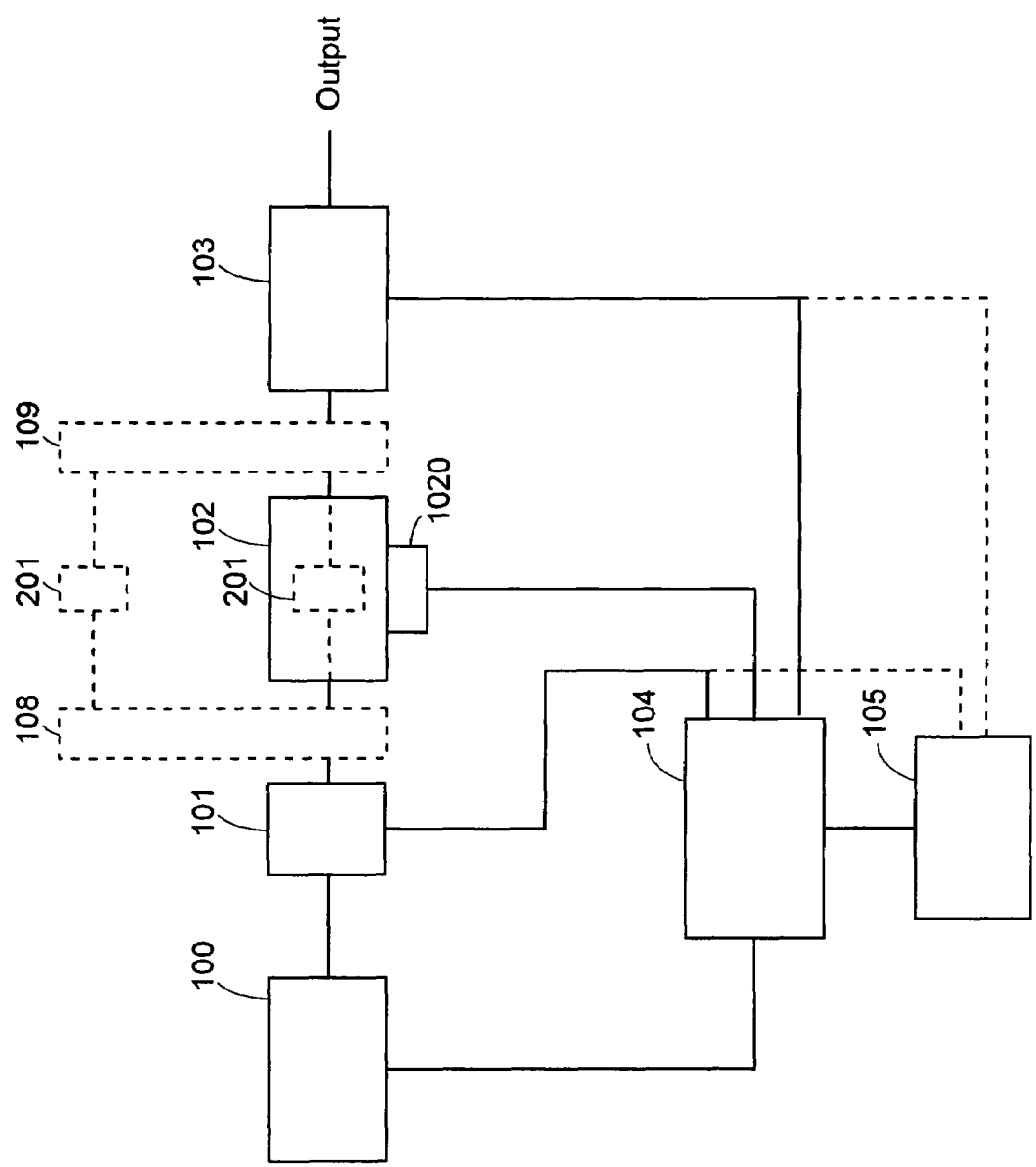
FIG. 13 is a block chart of the present invention showing that a controllable front-end gearbox in FIG. 2 is further adapted with a controllable clutch.

FIG. 13 is a block chart of the present invention showing that a controllable front-end gearbox in FIG. 2 is further adapted with a controllable clutch.

Figure 14:
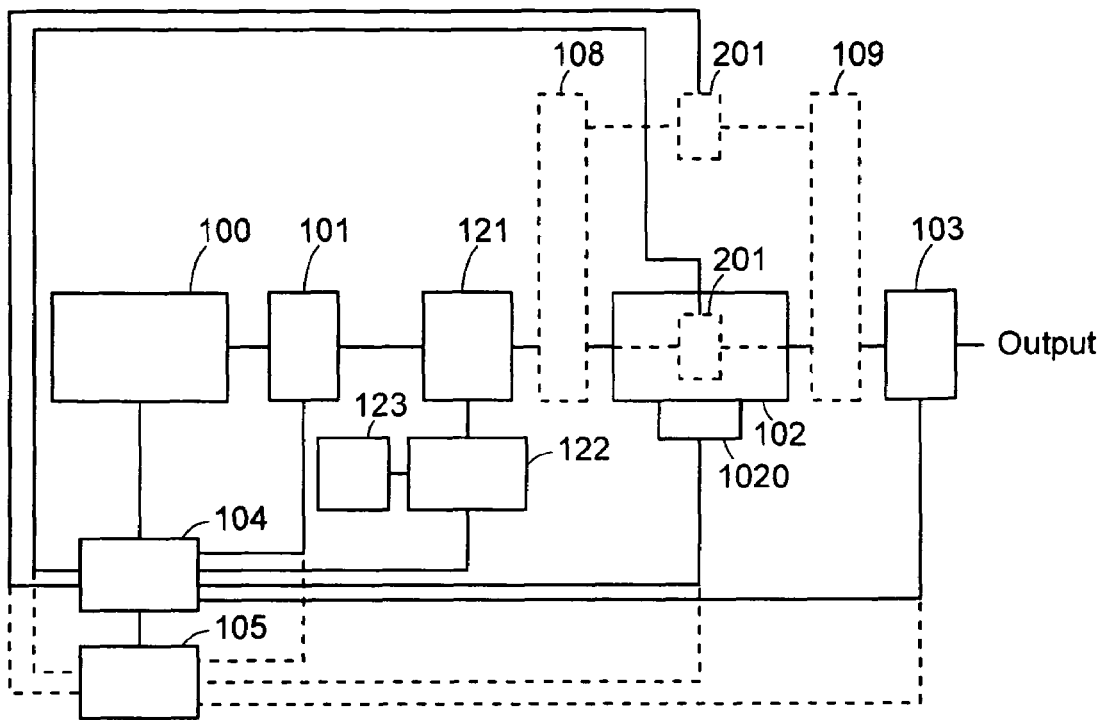
FIG. 14 is a block chart of the present invention showing that a controllable front-end gearbox in FIG. 10 is further adapted with a controllable clutch.

FIG. 14 is a block chart of the present invention showing that a controllable front-end gearbox in FIG. 10 is further adapted with a controllable clutch.

Figure 15:
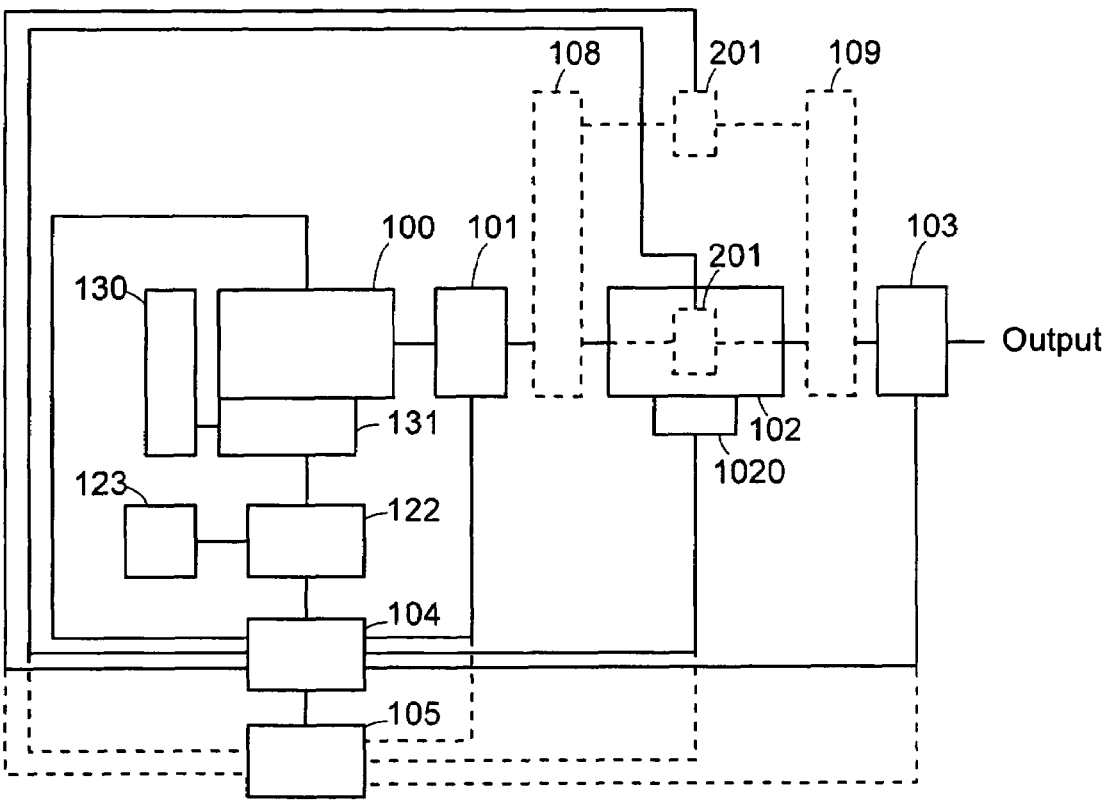
FIG. 15 is a block chart of the present invention showing that a controllable front-end gearbox in FIG. 11 is further adapted with a controllable clutch.

FIG. 15 is a block chart of the present invention showing that a controllable front-end gearbox in FIG. 11 is further adapted with a controllable clutch.

Figure 16:
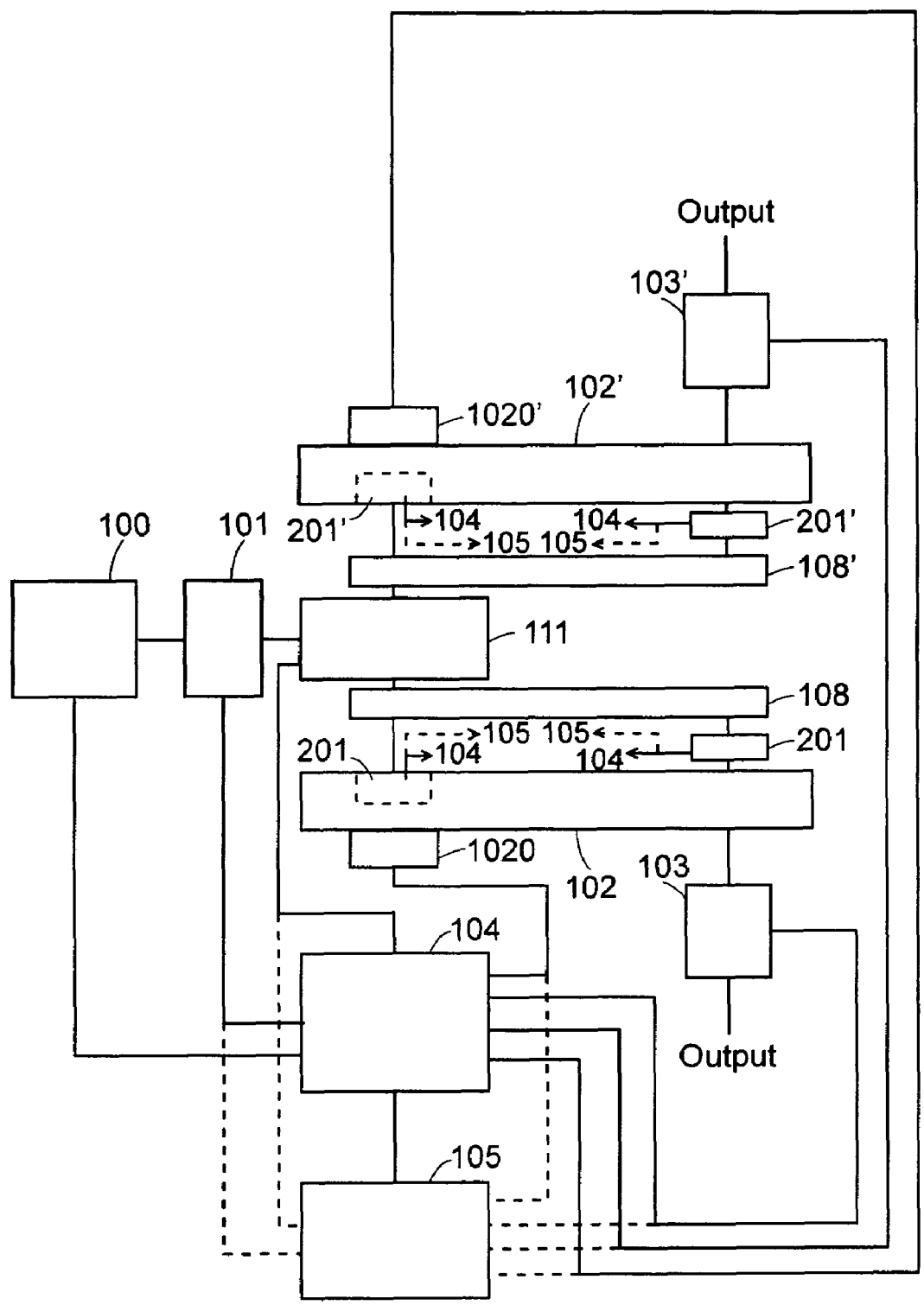
FIG. 16 is a block chart of the present invention showing that a controllable front-end gearbox of each power train in FIG. 12 is further adapted with a controllable clutch.

FIG. 16 is a block chart of the present invention showing that a controllable front-end gearbox of each power train in FIG. 12 is further adapted with a controllable clutch.

In the embodiment as illustrated in FIG. 16 for the individual application of a plurality of a power train, the controllable front-end gearbox 102 of the first power train is disposed at where between the input end to couple the power distribution device 111 and the output end to drive the rear-end output gearbox 103, so that when the controllable clutch 201 is closed, the input end coupled to the power distribution device 111 and the output end to drive the rear-end gearbox 103 to reduce transmission loss via direct coupling to the transmission by means of the clutch 201 without relying upon the front-end gearbox 102;

The clutch 201 may be provided inside or outside the controllable front-end gearbox 102. If the clutch is provided externally to the controllable front-end gearbox 102, the gearbox 108 is disposed to provide the transmission between the input end of the controllable front-end gearbox 102 and the input end of the clutch 201. When the externally disposed clutch 201 is closed, the clutch 201 executes direct transmission between the input end to couple to the power distribution device 111 and the output end to drive the rear-end output gearbox 103 for promoting the transmission efficiency;

In the second power train, a clutch 201' is disposed to the controllable front-end gearbox 102' at where between the input end to couple the power distribution device 111 and the output end to drive a rear-end output gearbox 103'. When the clutch 201' is closed, directly coupled transmission is achieved between the input end to couple the power distribution device 111 and the output end to drive a rear-end output gearbox 103' for reduction of transmission loss;

The clutch 201' may be provided inside or outside the controllable front-end gearbox 102'. If the clutch is provided externally to the controllable front-end gearbox 102', a gearbox 108' is disposed to provide the transmission between the input end of the controllable front-end gearbox 102' and the input end of the clutch 201'. When the externally disposed clutch 201' is closed, the clutch 201' executes direct transmission between the input end to couple to the power distribution device 111 and the output end to drive the rear-end output gearbox 103' for promoting the transmission efficiency;

Two or more than two revolving output ends may be provided at the output end of the power allotment device 111 as required, and the multiple output power train may contain two or more than two power trains to drive multiple wheels, such as drive vehicles with four or more than four wheels, or to drove tracked vehicle or any other load that requires driving multiple units.

Figure 17:
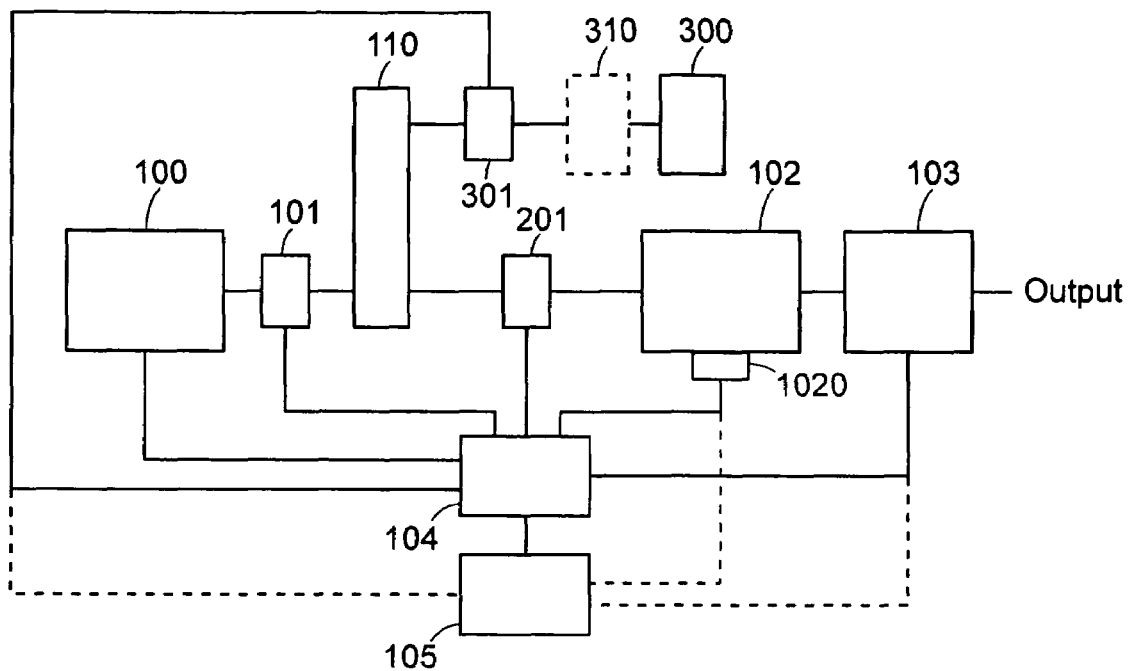
FIG. 17 is a block chart of the present invention adapted with a rechargeable kinetic flywheel system.

As illustrated in FIG. 17, the controllable transmission power system incorporated with an engine running at a fixed speed of the present invention is further adapted at a specific location a transmission, a controllable clutch, and an inertial flywheel. Accordingly, in applying a braking, or at where the engine is running with comparatively low load of BSFC (Braking Specific Fuel Consumption), the controllable clutch adapted to the flywheel is closed while the revolving kinetics from the engine drives the flywheel to operate to store kinetics for increasing the load of the engine through the transmission and the controllable clutch for the engine to operate in an range with better BSFC. With the controllable clutch closed, the kinetics stored in the flywheel are released within the heavy load operation range in case of startup or emergency acceleration to provide auxiliary drive to help the engine driving the load for energy saving purpose.

FIG. 17 is a block chart of the present invention adapted with a rechargeable kinetic flywheel system. It is essentially comprised of:

- an engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;
- the clutch 101 or 201: relates to an optional item of a clutching device driven by manual, mechanical, electromagnetic, fluid, or eccentric force, or a one-way transmission disposed at where between the output side of the engine 100 and the controllable front-end gearbox 102;
- the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, fluidity, or electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;
- the active control device 1020: an optional item related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;
- a rear-end gearbox 103: an optional item related to a gearbox with fixed transmission ratio, a step gear shift operated by manual, or a step or tension automatic gearbox, or a step or tension gearbox of microprocessor controlled automatic gear shift, including gear, friction gear, pulley, sprocket, fluidity, or electromagnetic transmission, or any other prior art of transmission, and to execute reverse output for reverse gear, the output of the rear-end gearbox may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;
- a manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, and the rear-end output gearbox 103 for outputting to drive the load;
- the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism;
- a flywheel 300: related to an optional item contains a rotary part to execute input and output of free revolution and to input or output by revolving the mechanical energy; and its nature as an inertial revolving object makes it being capable of directly accepting the input or output revolving kinetics, or a front-end gearbox 310 containing various speed ratios may be adapted to the flywheel 300 as required;
- a controllable clutch 301: an optional item relates to an optional item of a clutching device driven by manual, mechanical, electromagnetic, fluid, or eccentric force, or to a one-way transmission disposed at where between the output side of the engine 100 and the rotary part of the flywheel 300;
- a transmission 110: an optional item disposed at where between the rotary part of the flywheel 300 and the revolving power source of the engine 100, is comprised of a conventional transmission, e.g., a gear, friction gear, pulley, serrated pulley, sprocket, fluidity, electromagnetic transmission, or any other prior art of transmission; and
- a front-end gearbox 310: an optional item related to an optional item comprised of a gear, friction gear, pulley, serrated pulley, sprocket, fluidity, electromagnetic, or any other prior art of transmission to provide the revolving kinetics;

By having provided at specific locations the transmission 110, the controllable clutch 301 and the flywheel 300 as described above, in applying a braking, or at where the engine 100 is running with comparatively low load of BSFC (Braking Specific Fuel Consumption), the controllable clutch 301 adapted to the flywheel 300 is closed while the revolving kinetics from the engine 100 drives the flywheel 300 to operate to store kinetics for increasing the load of the engine through the transmission 110 and the controllable clutch 301 for the engine 106 to operate in an range with better BSFC. With the controllable clutch 301 closed, the kinetics stored in the flywheel 300 are released within the heavy load operation range in case of startup or emergency acceleration to provide auxiliary drive to help the engine 100 driving the load for energy saving purpose.

Figure 18:
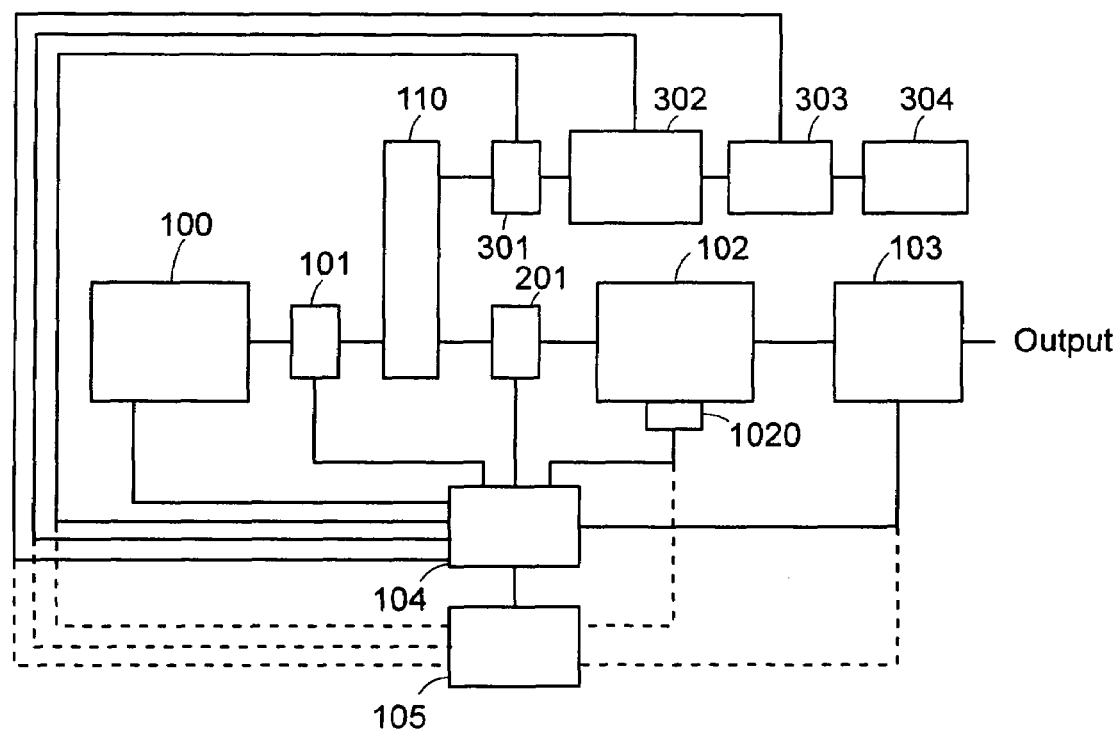
FIG. 18 is a block chart of the present invention adapted with a system that operates as a revolving electric machine and rechargeable device system at the same time for power generation and electric drive purposes.

As illustrated in FIG. 18, the controllable transmission power system incorporated with an engine running at a fixed speed of the present invention is further adapted at a specific location a transmission 110, a controllable clutch, and a revolving electric machine that operates as a power generator or electric driver. Accordingly, in applying a braking, or at where the engine is running with comparatively low load of BSFC (Braking Specific Fuel Consumption), the controllable clutch is closed while the revolving kinetics from the engine drives the revolving electric machine to operate as a generator and to charge the rechargeable device by means of a control device so to increase the load of the engine for the engine to operate in an range with better BSFC. With the controllable clutch closed, the power is released from the rechargeable device to drive through the control device the revolving electric machine to operate as a motor to help drive the load for achieving energy saving purpose.

FIG. 18 is a block chart of the present invention adapted with a system that operates as a revolving electric machine and rechargeable device system at the same time for power generation and electric drive purposes. The preferred embodiment is essentially comprised of:

the engine 100: relates to an internal combustion engine driven by gasoline, diesel, petrol oil essence, hydrogen, gas, bio-fuel, or any other type of fuel; adapted optionally with peripherals related to the operation status of the engine 100 including start-up, rpm detection, rpm control, electric system, fuel supply, ignition, exhaust treatment, cooling devices;

the clutch 101: relates to an optional item of a clutching device driven by manual, mechanical, electromagnetic, fluid, or eccentric force, or a one-way transmission disposed at where between the output side of the engine 100 and the controllable front-end gearbox 102;

the controllable front-end gearbox 102: includes an active control device 1020 for directly active control by manual or indirectly active control through a drive control interface 105 manual operation of step gear shift, or manual operation of shift of transmission ratio including step automatic transmission, or step or tension automatic gearbox; or using a microprocessor to execute step or tension gearbox in automatic transmission operation; the controllable front-end gearbox 102 is comprised of a transmission driven by gear, friction gear, pulley, fluidity, or electromagnetic transmission, or any other prior art of transmission with its output characterized by having an zero-output or selected rating of output at lower rpm as the starting point, and executing the active control either directly by manual or indirectly through the drive control interface 105 to change the transmission ratio and accelerate for the output at higher rpm; and the output end is available for driving a load, or driving two loads that may execute differential operation as driven by a differential gear set, or to drive a load from the output end of a rear-end output gearbox when adapted with an optional rear-end output gearbox;

the active control device 1020: an optional item related to a physical structure that produces activated displacement when driven by a mechanical structure, electromechanical structure, air pressure, hydraulic, coil, vacuum suction, electromagnetic attraction or rejection, or any other controller so to put under the control by manual, mechanical force, electric signal or photo signal for executing the active control of the controllable front-end gearbox 102 to engage in relative change in transmission ratio;

the rear-end gearbox 103: an optional item related to a gearbox with fixed transmission ratio, a step gear shift operated by manual, or a step or tension automatic gearbox, or a step or tension gearbox of microprocessor controlled automatic gear shift, including gear, friction gear, pulley, sprocket, fluidity, electromagnetic transmission, or any other prior art of transmission, and to execute reverse output for reverse gear, the output of the rear-end gearbox may be manually controlled or controlled in automatic transmission by a microprocessor to provide output at higher rpm by changing the transmission ratio from zero-output or a selected output at lower rpm, and its output end is available for driving a load, or driving two loads that may execute differential operation as driven by a differential gear set;

the manual operation interface 104: comprised of a manual mechanical device operating by manual, or any physical interface device operating by electric ON/OFF push button, or photo or audio energy to directly control or indirectly control by means of the drive control interface 105 of the engine 100, the clutch 101, the active control device 1020, the controllable front-end gearbox 102, and the rear-end output gearbox 103 for outputting to drive the load;

the drive control interface 105: an optional item comprised of a mechanical device, electromechanical device, electronic device or a microprocessor and related software for receiving the transmission operation from the manual operation interface 104, or electric, radio wave, photo or audio signals to control those peripherals related to the operation status of the engine 100, the clutch 101, or the active control device 1020 of the controllable front-end gearbox 102 to engage in the operation of related mechanism;

the controllable clutch 301: an optional item relates to an optional item of a clutching device driven by manual, mechanical, electromagnetic, fluid, or eccentric force, or to a one-way transmission disposed at where between the output side of the engine 100 and the rotary part of the flywheel 300;

a revolving electric machine 302: relates to an internal or external rotation type of AC or DC, brush or brushless, synchronous or asynchronous revolving electric machine, containing magnetic field and a rotor to function as a generator through the control device 303 to charge a rechargeable device 304, and to function as a motor for the power from the rechargeable device 304 to drive the revolving electric machine 302 to operate as a motor;

a control device 303: comprised of a dynamo-electric, electronic, or power type solid status electronic device to control the revolving electric machine 302 to operate as a generator, and to control the output voltage, amperage or polarity;

the rechargeable device 304: related to any rechargeable battery, capacitor, super-capacitor, or fuel battery of the prior art to recharge or release electric energy; and the transmission 110: an optional item disposed at where between the rotary part of the revolving electric machine 302 and the revolving power source of the engine, is comprised of a conventional transmission, e.g., a gear, friction gear, pulley, serrated pulley, sprocket, fluidity, or electromagnetic transmission, or any other prior art of transmission;

By having provided at specific locations the transmission 110, the controllable clutch 301, and the revolving electric machine 302 that operates as a generator or electric driver; in applying a braking, or at where the engine 100 is running with comparatively low load of BSFC (Braking Specific Fuel Consumption), the controllable clutch 301 is closed while the revolving kinetics from the engine 100 drives the revolving electric machine 302 to operate as a generator driven by the controllable clutch 301 through the transmission 110 and to charge the rechargeable device 304 by means of the control device 303 so to increase the load of the engine 100 for the engine to operate in an range with better BSFC. With the controllable clutch 301 closed, the power is released from the rechargeable device 304 to drive through the control device 301 the revolving electric machine 302 to operate as a motor through the control device 303 to help the engine 100 to drive the load for achieving energy saving purpose.

Figure 19:
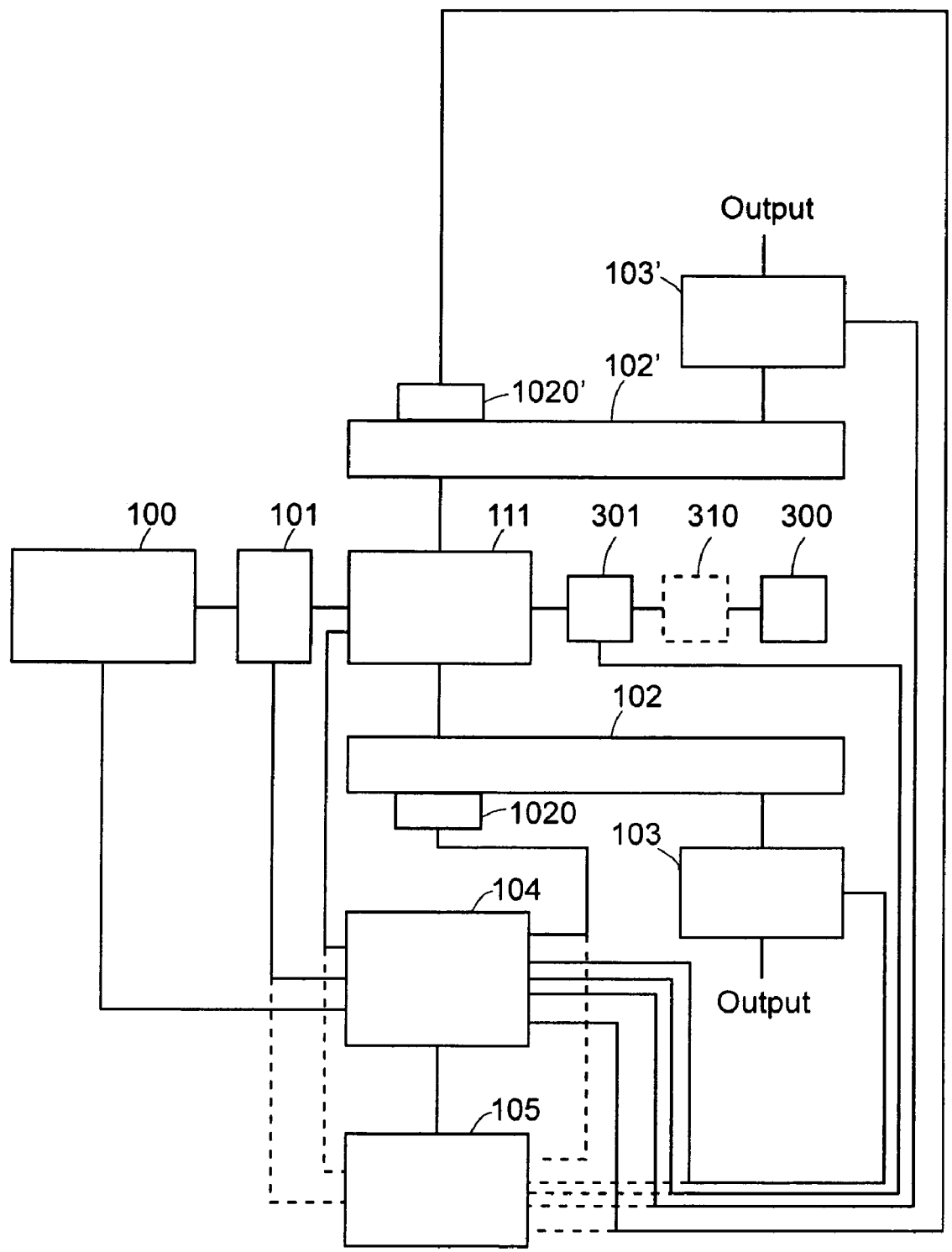
FIG. 19 is block chart of the present invention illustrated in FIG. 12 adapted with the rechargeable kinetic flywheel system.

The controllable transmission power system incorporated with an engine running at a fixed speed of the present invention when applied in the power output of multiple power trains as illustrated in FIG. 19, the motive power side of the power distribution device of the system drives the controllable clutch and the inertial flywheel. Accordingly, in applying a braking, or at where the engine is running with comparatively low load of BSFC (Braking Specific Fuel Consumption), the controllable clutch adapted to the flywheel 300 is closed while the revolving kinetics from the engine drives the flywheel through the motive power side of the power distribution device to operate for storage of kinetics to increase the load of the engine for the engine to operate in an range with better BSFC. With the controllable clutch closed, the power is released from the flywheel to provide auxiliary drive in the heavy load operation ranges in case of start-up or emergency acceleration help the engine drive the load for achieving energy saving purpose.

FIG. 19 is block chart of the present invention illustrated in FIG. 12 adapted with the rechargeable kinetic flywheel system. Other than the system as illustrated in FIG. 12, the system is further adapted with the following devices:

the flywheel 300: related to an optional item contains a rotary part to execute input and output of free revolution and to input or output by revolving the mechanical energy; and its nature as an inertial revolving object makes it being capable of directly accepting the input or output revolving kinetics, or a front-end gearbox 310 containing various speed ratios may be adapted to the flywheel 300 as required;

the controllable clutch 301: an operational item relates to an optional item of a clutching device driven by manual, mechanical, electromagnetic, fluid, or eccentric force, or to a one-way transmission disposed at where between the output side of the engine 100 and the rotary part of the flywheel 300; and a front-end gearbox 310: related to an optional item comprised of a gear, friction gear, pulley, serrated pulley, sprocket, fluidity, electromagnetic transmission, or any other prior art of transmission to provide the revolving kinetics;

By taking advantage of the motive power side of the power distribution device 111 of the system as described above to drive the controllable clutch 301 and the inertial flywheel 300, in applying a braking, or at where the engine 100 is running with comparatively low load of BSFC (Braking Specific Fuel Consumption), the controllable clutch 301 adapted to the flywheel 300 is closed while the revolving kinetics from the engine 100 drives the flywheel 300 through the motive power side of the power distribution device 111 to operate, and through the operation for storage of kinetics by the flywheel 300 as driven by the controllable clutch 301 to increase the load of the engine 100 for the engine 100 to operate in an range with better BSFC. With the controllable clutch 301 closed, the power is released from the flywheel 300 to provide auxiliary drive in the heavy load operation ranges in case of start-up or emergency acceleration help the engine 100 drive the load for achieving energy saving purpose.

Figure 20:
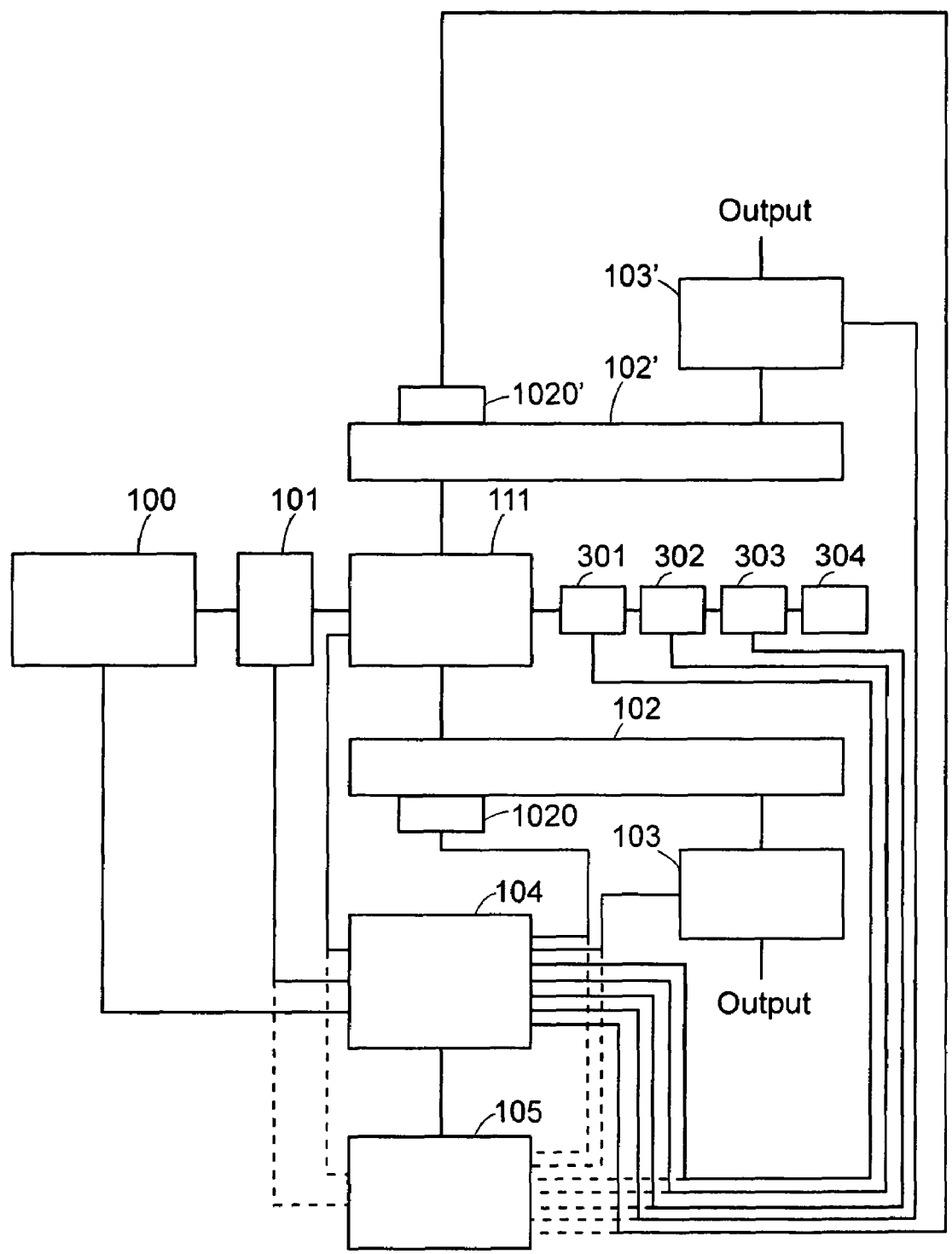
FIG. 20 is a block chart of the present invention illustrated in FIG. 12 adapted with a system that operates as a revolving electric machine and rechargeable device system at the same time for power generation and electric drive purposes.

As illustrated in FIG. 20, when the controllable transmission power system incorporated with an engine running at a fixed speed of the present invention is applied in power output of multiple output power trains, the motive power side of the power distribution device of the system drives a controllable clutch and a revolving electric machine that operates as a generator or a power driver. Accordingly, in applying a braking, or at where the engine is running with comparatively low load of BSFC (Braking Specific Fuel Consumption), the controllable clutch is closed while the revolving kinetics from the engine drives the revolving electric machine to operate as a generator through the motive power side of the power distribution device and the controllable clutch, and to charge the rechargeable device by means of a control device so to increase the load of the engine for the engine to operate in an range with better BSFC. With the controllable clutch closed, the power is released from the rechargeable device to drive through the control device the revolving electric machine to operate as a motor to help the engine drive the load for achieving energy saving purpose.

FIG. 20 is a block chart of the present invention as illustrated in FIG. 12 further adapted with a system that operates as a revolving electric machine and rechargeable device system at the same time for power generation and electric drive purposes. Other than the system as illustrated in FIG. 12, the system is further adapted with the following devices:

the controllable clutch 301: an optional item relates to an optional item of a clutching device driven by manual, mechanical, electromagnetic, fluid, or eccentric force, or to a one-way transmission disposed at where between the power distribution device 111 and the revolving electric machine 302;

the revolving electric machine 302: relates to an internal or external rotation type of AC or DC, brush or brushless, synchronous or asynchronous revolving electric machine 302, containing magnetic field and a rotor to function as a generator to charge a rechargeable device 304, and to function as a motor for the power from the rechargeable device 304 to drive the revolving electric machine 302 to operate as a motor through the control by the controllable device 303;

a control device 303: comprised of a dynamo-electric, electronic, or power type solid status electronic device to control the revolving electric machine 302 to operate as a generator, and to control the output voltage, amperage or polarity, or control its frequency of phase at the same time when operating in an AC power generation system; and the rechargeable device 304: related to any rechargeable battery, capacitor, super-capacitor, or fuel battery of the prior art to recharge or release electric energy;

By having the motive power side of the power distribution device of the system as described above to drive a controllable clutch and a revolving electric machine that operates as a generator or a power driver, in applying a braking, or at where the engine is running with comparatively low load of BSFC (Braking Specific Fuel Consumption), the controllable clutch 301 is closed while the revolving kinetics from the engine 100 drives the revolving electric machine 302 to operate as a generator through the motive power side of the power distribution device and the controllable clutch 301, and to charge the rechargeable device 304 by means of a control device 303 so to increase the load of the engine for the engine 100 to operate in an range with better BSFC. With the controllable clutch 301 closed, the power is released from the rechargeable device 304 to drive through the control device 303 the revolving electric machine 302 to operate as a motor to help the engine 100 to drive the load for achieving energy saving purpose.

Figure 21:
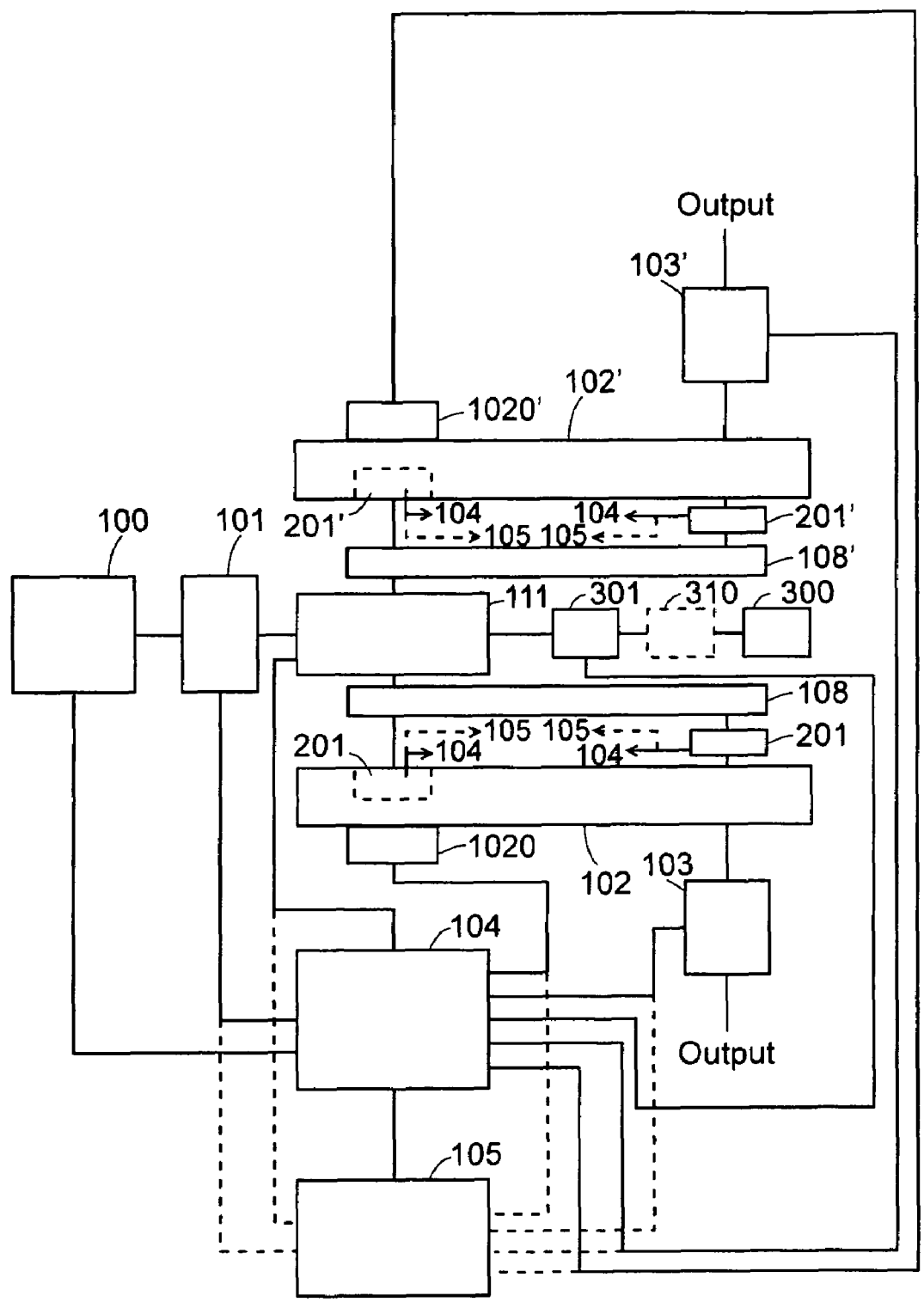
FIG. 21 is block chart of the present invention illustrate din FIG. 16 adapted with the rechargeable kinetic flywheel system.

As illustrated in FIG. 21, when the controllable transmission power system incorporated with an engine running at a fixed speed of the present invention is applied in power output of multiple output power trains, the motive power side of the power distribution device of the system drives a controllable clutch and an inertial flywheel. Accordingly, in applying a braking, or at where the engine is running with comparatively low load of BSFC (Braking Specific Fuel Consumption), the controllable clutch adapted to the flywheel 300 is closed while the revolving kinetics from the engine drives through the motive power side of the power distribution device the flywheel to store kinetics for increasing the load of the engine, thus for the engine to operate in an range with better BSFC. With the controllable clutch closed, kinetics stored in the flywheel is released help the engine drive the load for achieving energy saving purpose.

FIG. 21 is block chart of the present invention as illustrated in FIG. 16 adapted with the rechargeable kinetic flywheel system. Other than the system as illustrated in FIG. 16, the system is further adapted with the following devices.

the flywheel 300: related to an optional item contains a rotary part to execute input and output of free revolution and to input or output by revolving the mechanical energy; and its nature as an inertial revolving object makes it being capable of directly accepting the input or output revolving kinetics, or a front-end gearbox 310 containing various speed ratios may be adapted to the flywheel 300 as required;

the controllable clutch 301: an optional item relates to an optional item of a clutching device driven by manual, mechanical, electromagnetic, fluid, or eccentric force, or to a one-way transmission disposed at where between the power distribution device 111 and the flywheel 300; and a front-end gearbox 310: an optional item related to an optional item comprised of a gear, friction gear, pulley, serrated pulley, sprocket, fluidity, electromagnetic transmission, or any other prior art of transmission to provide the revolving kinetics;

By taking advantage of the motive power side of the power distribution device 111 of the system as described above to drive the controllable clutch 301 and the inertial flywheel 300, in applying a braking, or at where the engine 100 is running with comparatively low load of BSFC (Braking Specific Fuel Consumption), the controllable clutch 301 adapted to the flywheel 300 is closed while the revolving kinetics from the engine 100 drives the flywheel 300 through the motive power side of the power distribution device 111 to operate for storage of kinetics to increase the load of the engine 100 for the engine 100 to operate in an range with better BSFC. With the controllable clutch 301 closed, the power is released from the flywheel 300 to provide auxiliary drive in the heavy load operation ranges in case of start-up or emergency acceleration help the engine 100 drive the load for achieving energy saving purpose.

Figure 22:
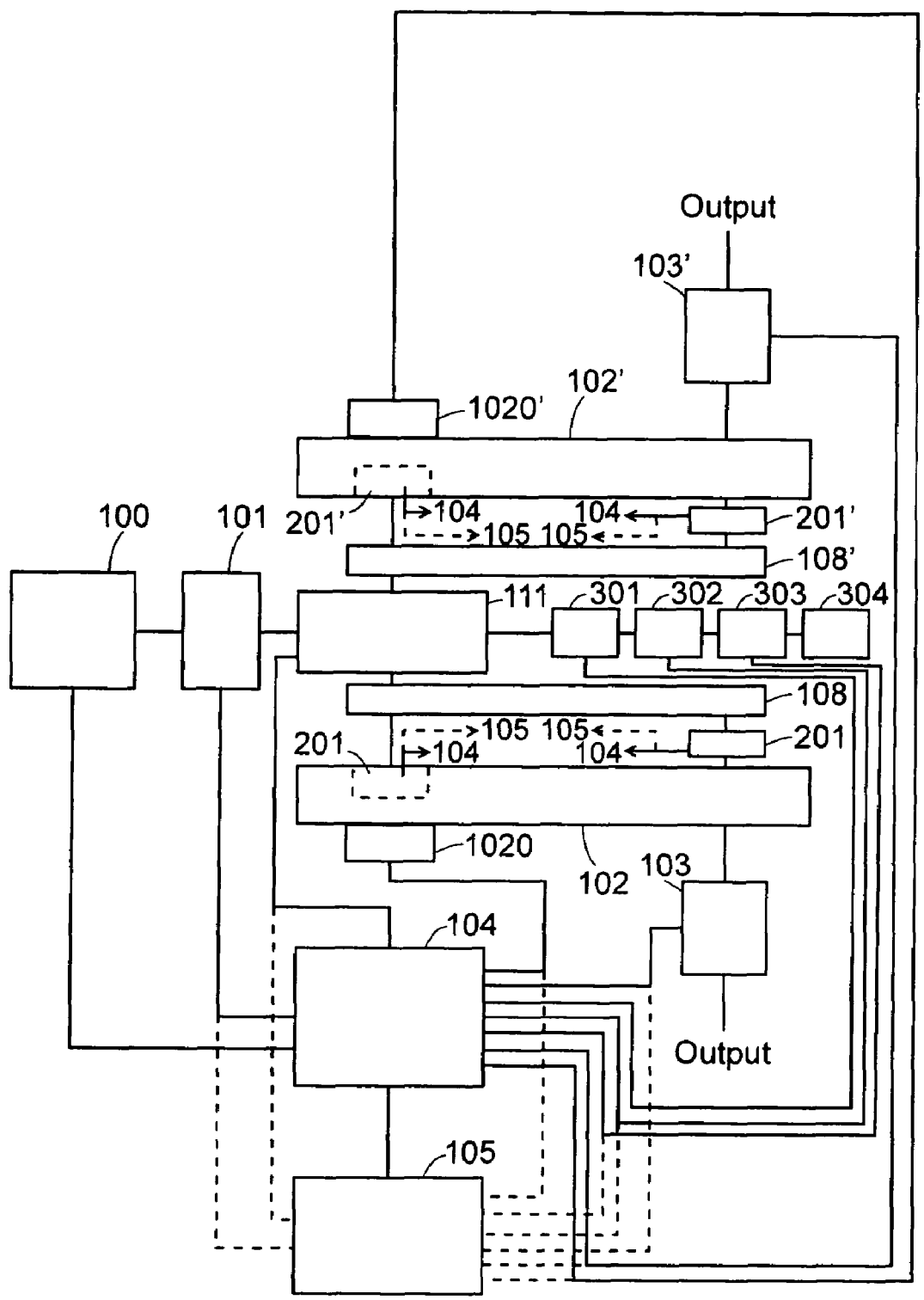
FIG. 22 is a block chart of the present invention illustrated in FIG. 16 adapted with a system that operates as a revolving

As illustrated in FIG. 22, when the controllable transmission power system incorporated with an engine running at a fixed speed of the present invention is applied in power output of multiple output power trains, the motive power side of the power distribution device of the system drives a controllable clutch and a revolving electric machine that operates as a generator or a power driver. Accordingly, in applying a braking, or at where the engine is running with comparatively low load of BSFC (Braking Specific Fuel Consumption), the controllable clutch is closed while the revolving kinetics from the engine drives the revolving electric machine to operate as a generator through the motive power side of the power distribution device and the controllable clutch, and to charge the rechargeable device by means of a control device so to increase the load of the engine for the engine to operate in an range with better BSFC. With the controllable clutch closed, the power is released from the rechargeable device to drive through the control device the revolving electric machine to operate as a motor to help the engine drive the load for achieving energy saving purpose.

FIG. 22 is a block chart of the present invention illustrated in FIG. 16 adapted with a system that operates as a revolving electric machine and rechargeable device system at the same time for power generation and electric drive purposes. Other than the system as illustrated in FIG. 16, the system is further adapted with the following devices:

the controllable clutch 301: an optional item relates to an optional item of a clutching device driven by manual, mechanical, electromagnetic, fluid, or eccentric force, or to a one-way transmission disposed at where between the power distribution device 111 and the revolving electric machine 302;

the revolving electric machine 302: relates to an internal or external rotation type of AC or DC, brush or brushless, synchronous or asynchronous revolving electric machine 302, containing magnetic field and a rotor to function as a generator to charge a rechargeable device 304, and to function as a motor for the power from the rechargeable device 304 to drive the revolving electric machine 302 to operate as a motor through the control by the control device 303;

a control device 303: comprised of a dynamo-electric, electronic, or power type solid status electronic device to control the revolving electric machine 302 to operate as a generator, and to control the output voltage, amperage or polarity, or control its frequency of phase at the same time when operating in an AC power generation system; and the rechargeable device 304: related to any rechargeable battery, capacitor, super-capacitor, or fuel battery of the prior art to recharge or release electric energy;

By having the motive power side of the power distribution device of the system as described above to drive a controllable clutch and a revolving electric machine that operates as a generator or a power driver, in applying a braking, or at where the engine is running with comparatively low load of BSFC (Braking Specific Fuel Consumption), the controllable clutch 301 is controlled for the revolving electric machine to operate as a generator, and to charge the rechargeable device 304 by means of the control device 303 so to increase the load of the engine 100 for the engine 100 to operate in an range with better BSFC. With the controllable clutch 301 closed, the power is released from the rechargeable device 304 to drive through the control device 303 the revolving electric machine 302 to operate as a motor to help the engine 100 to drive the load for achieving energy saving purpose.

As described above, a controllable transmission power system incorporated with an engine running at a fixed speed of the present invention achieves the purpose of fuel consumption for the motor vehicles by controlling the engine to run at or approximately at a fixed speed within a range of rpm with higher braking specific fuel consumption (BSFC) efficiency when the engine is started, accelerating and running at medium or lower rpm, and by having the controllable front-end gearbox 102 that provides active control to drive a load to accelerate from the lower up to the higher rpm, and to run at medium rpm when the car is driving in downtown or during peak hours.

The invention claimed is:

1. A power system of controllable transmission, the power system incorporated with an engine that controls the engine to run at a substantially fixed speed or approaching a fixed speed within an rpm range with higher BSFC (braking specific fuel consumption) when the engine is started up from static status and in an acceleration from low to high rpm, an output end of the engine is provided to drive a controllable front-end gearbox that is capable of actively controlling and executing variable or invariable gearshift so to activate the output end to execute the acceleration from lower to higher rpm; meanwhile, in the course of the start-up and the acceleration from lower to higher rpm and in driving operation, the engine runs in an rpm range with higher BSFC for saving fuel, wherein:

the engine (100) comprises an internal combustion engine driven by any type of fuel; adapted optionally with peripherals related to the operation status of the engine (100) including start-up, rpm detection, rpm control, electric system, fuel supply, ignition, exhaust treatment, cooling devices;

a clutch (101) is provided comprising a clutching device driven by manual, mechanical, electromagnetic, fluid, or eccentric force, or a one-way transmission to be disposed between the output end of the engine (100) and the controllable front-end gearbox (102);

the controllable front-end gearbox (102): comprises an active control device (1020) for direct manual active control or indirect active control through a drive control interface (105) manual operation of step gearshift, or manual operation of shift of transmission ratio including step automatic transmission, or step or stepless automatic gearbox; or using a microprocessor to execute step or stepless gearbox in automatic transmission operation; further comprising a transmission driven by gear, friction gear, pulley, sprocket, fluidity, electromagnetic transmission, or any other transmission having an zero-output or selected rating of output at lower rpm as a starting point, and executing the active control to change the transmission ratio and execute the acceleration from lower to higher rpm; and the output end is available for driving a load, or driving two loads that may execute differential operation, or driving an optional rear-end output gearbox when disposed as required to drive a load from the output end of the rear-end output gearbox;

the active control device (1020) comprises a physical structure that produces activated displacement when driven by a mechanical structure, electro-mechanical structure, air pressure, hydraulic, coil, vacuum suction, electromagnetic attraction or rejection, or any other control device so to put under control by manual, mechanical force, electric signal or photo signal for executing the active control of the controllable front-end gearbox (102) to engage in relative change in the transmission ratio;

the rear-end output gearbox (103), is provided comprising a gearbox with fixed transmission ratio, a step gearshift operated by manual, or a step or stepless automatic gearbox, or a step or stepless gearbox of microprocessor controlled automatic gearshift, including gear, friction gear, pulley, sprocket, fluidity or electromagnetic transmission, or any other transmission, wherein to execute reverse output for reverse gear, an output of the rear-end gearbox may be manually controlled or controlled in automatic transmission by a microprocessor to provide output at higher rpm by changing the transmission ratio from zero-output or a selected output at lower rpm, and wherein an output end of the rear-end gearbox is available for driving a load, or driving two loads that execute differential operation;

a manual operation interface (104) is provided comprising a physical interface device operating by hand, or operating by electric ON/OFF push button, or photo or audio energy to directly control or indirectly control the engine (100), the clutch (101), the active control device (1020), the controllable front-end gearbox (102), and the rear-end output gearbox (103) through the drive control interface (105) for outputting to drive the load; and the drive control interface (105) comprises a mechanical device, electromechanical device, electronic device or a microprocessor and related software for receiving the transmission operation from the manual operation interface (104), or electric, radio wave, photo or audio signals to control those peripherals related to the operation status of the engine (100), the clutch (101), or the active control device (1020) of the controllable front-end gearbox (102) to engage in the operation of related mechanism;

wherein said power system as described above upon starting the engine (100) provides better BSFC efficiency by having the engine (100) run at or approximately at fixed speed within the range of higher rpm and executing the active control the optional controllable front-end gearbox to output from lower rpm and higher rpm, such that when the output from the controllable front-end gearbox (102) reaches a preset rpm or torque, the engine (100) engages in variable operation within the range of higher rpm through control by the drive interface device (105) controlling the manual operation interface (104) so as to increase rpm or torque; meanwhile, the controllable front-end gearbox (102) is directly subject to control by the manual operation interface (104) or by the active control device (1020) to make an output of relatively variable speed ratio; the output of relatively variable speed ratio is made by means of controlling the speed ratio of the rear-end output gearbox (103).

2. The power system of claim 1, wherein the system further comprises a revolving electric machine connected in series that provides at the same time function as a generator and as a motor to be applied in a power system of stop-go function of an engine;

first and second clutches (101), (201): each driven by manual, mechanical, electromagnetic, fluid, or eccentric force; wherein the clutch (101) is disposed between the output side of the engine (100) and the revolving electric machine (121), and the second clutch (201) is disposed between the revolving electric machine (121) and the controllable front-end gearbox (102);

the manual operation interface (104); and the drive control interface (105);

the revolving electric machine (121) is a dual-end shaft revolving electric machine comprised of AC or DC, brush or brushless, synchronous or asynchronous revolving electric machine with the shafts at both ends thereof connected in series between the first clutch (101) and the controllable front-end gearbox (102) for the active control to provide the following functions:

(a) when the revolving machine (121) is driven to operate as a generator, it recharges a battery (123) or supplies power to other loads driven by electric energy through a circuit control device (122); at this time, the first clutch (101) is closed, and the second clutch (201) may be closed or released as applicable, and (b) when the revolving electric machine (121) is driven by the power from the battery (123) through a circuit control device (122) to operate as a motor, to start up an engine or drive other mechanical force to drive a load; at this time, the first clutch (101) is closed, and the second clutch (201) may be closed or released as applicable;

the circuit control device (122) is a dynamo-electric device or electronic device subject to control by the manual operation interface (104) and the drive control interface (105) so to further control the power in the battery (123), drive the revolving electric machine (121) to operate as a motor, and control features of amperage, voltage, rpm, revolving direction, and torque when the revolving electric machine (121) is operating as a motor; or when the revolving electric machine (121) operates as a generator, to control the power generated from the revolving electric machine (121), voltage, amperage, timing and automatic cut-off upon saturation in charging the battery (123); and the battery (123) comprises any type of rechargeable battery, capacitor, or super-capacitor configured to store or discharge electric power.

3. The power system of claim 1, wherein the system further comprises:

an electric machine integrated with the functions of a motor and a generator to be applied in a power system of Stop & Go Function of the engine;

the electric machine (131) integrated with the functions of a motor and a generator being a revolving electric machine comprised of AC or DC, brush or brushless, synchronous or asynchronous revolving electric machine with its revolving shaft directly coupled to the front end or the rear rend of the shaft of the engine (100), or to engage in transmission mutually with the shaft of the engine (100) by means of a transmission assembly (130) to provide the following functions:

(i) when the electric machine (131) functions as a generator, it recharges a battery (123) or supplies power to other loads driven by electric energy through a circuit control device (122); and (ii) the power from the battery (123) controls through the circuit control device (122) driving the electric machine (131) to operate as a motor to start up the engine or drive a load;

the circuit control device (122) is a dynamo-electric device or electronic device subject to the control by the manual operation interface (104) and the drive control interface (105);

the battery (123) comprises any type of rechargeable battery, capacitor, or super-capacitor configured to store or discharge electric power; and the transmission assembly (130) comprises a shaft-to-shaft coupler, or gear, friction gear, pulley, serrated pulley, sprocket, fluidity, electromagnetic, or any other transmission; or when required, an optional item of a controllable clutch subject to control by the circuit control device (122) and is disposed between a shaft of the engine (100), and a rotation part of the electric machine (131) so as to control transmission between the shaft of the engine (100), and the rotation part of the electric machine (131);

the electric machine (131) may comprise a conventional motor and a generator if and when required, and their operating functions in the system are the same as that provided by the electric machine (131) integrated with the functions of a motor and a generator;

the power system provided with the immediate Stop and Go Function of the present invention is controlled through the manual operation interface (104) and the drive interface device (105) with its operation mechanism as follows:

(a) provide immediate operation of Stop & Go Function: when the load stops, the engine stops running; upon starting up, the power from the battery (123) drives the electric machine (131) to operate as a motor for starting up the engine or driving the load, and controlling features of amperage, voltage, rpm, revolving direction, and torque;

(b) once started, the engine maintains running at a fixed speed or at a speed approaching a fixed speed within the area with comparatively higher BSFC; the controllable front-end gearbox (102) is controlled by the manual operation interface (104) through the drive interface device (105) and then through the active control device (1020), or is directly controlled by the drive interface device (105) for the output from the controllable front-end gearbox (102) to engage in relatively faster or slower operation;

(c) provide a function: when the output from controllable front-end gearbox (102) reaches a preset rpm or torque, the engine (100) is controlled to engage in the variable operation within a range of comparatively higher rpm through the by the drive interface device (105) controlling the manual operation interface (104) so as to increase rpm or torque; meanwhile, the controllable front-end gearbox (102) is directly subject to the control by the manual operation interface (104) or through the control by the active control device (1020) to make the output of relatively variable speed ratio; if the system is provided with a rear-end output gearbox (103), the output of relatively variable speed ratio is made by means of controlling the speed ratio of the rear-end output gearbox (103);

(d) to control charging voltage, amperage, timing to start charging, and automatic cut-off, upon charging the battery (123) is saturated with power generated from the electric machine (131) when the electric machine (131) is operating as a generator; and (e) during a process of deceleration, driving down a slope, or applying a brake, the electric machine (131) is driven by load inertia to operate as a generator to supply power to the battery (123) to produce braking.

4. The power system of claim 1, wherein a controllable clutch (201) is further disposed between the input end and the output end of the controllable front-end gearbox (102); once the controllable clutch (201) is closed, both of the input and the output ends are directly coupled to each other for transmission for reducing transmission loss; or alternatively, the controllable clutch (201) may be disposed inside or outside the controllable front-end gearbox, having a first gearbox (108) to function as a transmission between the in put end of the controllable front-end gearbox (102) and the input end of the controllable clutch (201), and having a second gearbox (109) as the transmission between the output end of the controllable front-end gearbox (102) and the output end of the controllable clutch (201), both of the input and the output ends of the controllable front-end gearbox (102) execute directly coupled transmission through the controllable clutch (201) when closed to reduce transmission loss.

5. The power system of claim 1, wherein the system is further provided with a transmission (110), a controllable clutch (301) and a flywheel (300); in applying a braking, or where the engine (100) is running with comparatively low load of BSFC (Braking Specific Fuel Consumption), the controllable clutch (301) adapted to the flywheel (300) is closed while rotary motion from the engine drives the flywheel (300) to store kinetic energy for increasing the load of the engine through the transmission (110) and the controllable clutch (301) for the engine (100) to operate in a range with better BSFC; while the controllable clutch (301) is closed, the kinetic energy stored in the flywheel (300) is released within a heavy load operation range in case of startup or emergency acceleration to provide auxiliary drive to help the engine (100) to drive the load for energy saving purposes; and wherein:

the flywheel (300), comprises a rotary part to execute input and output of free revolution and to input or output the rotary kinetic energy; wherein as an inertial revolving object the flywheel is capable of directly accepting the input or output of rotary kinetic energy, or a front-end gearbox (310) containing various speed ratios may be adapted to the flywheel (300) as required;

the controllable clutch (301) is driven by manual, mechanical, electromagnetic, fluid, or eccentric force, or to a one-way transmission disposed between the output side of the engine (100) and the rotary part of the flywheel (300);

the transmission (110) disposed between the rotary part of the flywheel (300) and a revolving power source of the engine (100)-comprises a conventional transmission, e.g., a gear, friction gear, pulley, serrated pulley, sprocket, fluidity, electromagnetic transmission, or any other transmission; and the front-end gearbox (310) comprises a gear, friction gear, pulley, serrated pulley, sprocket, fluidity, electromagnetic, or any other prior art of transmission to provide the rotary motion.

6. The power system of claim 1, wherein the system is further provided with a transmission (110, a controllable clutch (301), and a revolving electric machine (302) that operates as a generator or electric motor; in applying a braking, or where the engine is running with comparatively low load of BSFC (Braking Specific Fuel Consumption), the controllable clutch (301) is closed, and the rotary kinetic energy from the engine (100) drives the revolving electric machine (302) to operate as a generator through the transmission (110) and the controllable clutch (301) and to charge a rechargeable device (304) by way of a control device (303) so as to increase a load of the engine (100) for the engine to operate in a range with better BSFC; while the engine (100) is running in heavy load operation range in case of start-up or emergency acceleration, the controllable clutch (301) operated to close, power is released from the rechargeable device (304) to drive the revolving electric machine (302) to operate as a motor through the control device (303) to help the engine (100) drive the load for achieving energy saving purposes; wherein:

the controllable clutch (301) comprises a clutching device driven by manual, mechanical, electromagnetic, fluid, or eccentric force, or a one-way transmission disposed between the output side of the engine (100) and the revolving electric machine (302);

the revolving electric machine (302) comprises an internal or external rotation type of AC or DC, brush or brushless, synchronous or asynchronous revolving electric machine, containing magnetic field and a rotor to function as a generator through the control device (303) to charge a rechargeable device (304) with the generated power, and to function as a motor for the power from the rechargeable device (304) to drive the revolving electric machine (302) to operate as a motor;

the control device (303) comprises a dynamo-electric, electronic, or power type solid status electronic device to control the revolving electric machine (302) to operate as a generator, and to control output voltage, amperage or polarity;

the rechargeable device (304) comprises any rechargeable battery, capacitor, super-capacitor, or fuel cell to recharge or release electric energy; and the transmission (110) is disposed between the rotary part of the revolving electric machine (302) and a revolving power source of the engine, and is comprised of a conventional transmission, e.g., a gear, friction gear, pulley, serrated pulley, sprocket, fluidity, or electromagnetic transmission, or any other transmission.

7. The power system of claim 1, wherein the system is applied in power output of multiple output power trains; the motive power side of a power allotment device (111) to drive a controllable clutch (301) and an inertial flywheel (300), in applying a braking, or where the engine (100) is running with comparatively low load of BSFC (Braking Specific Fuel Consumption), the controllable clutch (301) adapted to the flywheel (300) is closed while rotary kinetic energy from the engine (100) drives the flywheel (300) through a motive power side of the power allotment device (111) and the controllable clutch (301) to store kinetic energy to increase the load of the engine (100) so that the engine (100) operates in an range with better BSFC; while the engine (100) is running in heavy load operation range in case of start-up or emergency acceleration, the controllable clutch (301) is operated to close, the power is released from the flywheel (300) to provide auxiliary drive to help the engine (100) to drive the load to achieve energy saving purposes; wherein:

the flywheel (300) comprises a rotary part to execute input and output of free revolution and to input or output the rotary kinetic energy; wherein the flywheel, as an inertial revolving object, is capable of directly accepting the input or output rotary kinetic energy, or a front-end gearbox (310) containing various speed ratios may be adapted to the flywheel (300) as required;

the controllable clutch (301)-is a clutching device driven by manual, mechanical, electromagnetic, fluid, or eccentric force, or a one-way transmission disposed between the power allotment device (111) and the rotary part of the flywheel (300); and the front-end gearbox (310) comprises a gear, friction gear, pulley, serrated pulley, sprocket, fluidity, electromagnetic transmission, or any other transmission to provide the rotary kinetic energy.

8. The power system of claim 1, wherein the system is applied in power output of multiple output power trains; a motive power side of a power allotment device of the system drives a controllable clutch (301) and a revolving electric machine (302) that operates as a generator or a motor, in applying a braking, or where the engine (100) is running with comparatively low load of BSFC (Braking Specific Fuel Consumption), the controllable clutch (301) is operated to close while the revolving electric machine (302) operates as a generator, and to charge a rechargeable device (304) by means of a control device (303) to increase the load of the engine (100), so that the engine (100) operates in an range with better BSFC; while the engine (100) is running in heavy load operation range in case of start-up or emergency acceleration, the controllable clutch (301) is operated to close, power is released from the rechargeable device (304) to drive the revolving electric machine (302) to operate as a motor through the control device (303) to help the engine drive the load for achieving energy saving purposes; wherein:

the controllable clutch (301) comprises a clutching device driven by manual, mechanical, electromagnetic, fluid, or eccentric force, or a one-way transmission disposed between the power allotment device (111) and the revolving electric machine (302);

the revolving electric machine (302) comprises an internal or external rotation type of AC or DC, brush or brushless, synchronous or asynchronous revolving electric machine, said revolving electric machine (302), containing magnetic field and a rotor is operated as a generator to charge a rechargeable device (304), and is operated as a motor by the power from the rechargeable device (304) through control by the controllable device (303);

the control device (303) comprises a dynamo-electric, electronic, or power type solid status electronic device to control the revolving electric machine (302) to operate as a generator, and to control output voltage, amperage or polarity, or control its frequency or phase sequence when operating in an AC power generation system; and the rechargeable device (304) comprises any rechargeable battery, capacitor, super-capacitor, or fuel cell to recharge or release electric energy.

9. The power system of claim 1, wherein the rear-end output gearbox (1033) consists of a transmission of fixed transmission ratio, speed increase or reduction as required, and an inverse output for inverse gear function adapted as required to output for driving a load, or driving two loads that engage in differential operation.

10. The power system of claim 9, wherein the power system provides any or all of the following functions:
  (a) stand-by function: wherein the engine (100) may be killed or idling at low rpm, the clutch (101) is in released status; and the controllable front-end gearbox (102) is at its Stop position;
  (b) start→low speed→medium speed drive function: wherein the engine (100) runs at or approximately at a fixed speed to operate within an rpm range of better BSFC efficiency, the clutch (101) is in its closed status, and the controllable front-end gearbox (102) produces output from low rpm accelerated to medium rpm to drive a load through the active control via the manual control interface (104) or indirectly by the drive control interface (105);
  (c) medium speed→high speed or greater torque drive function: wherein if the system requires drive output function at higher speed or greater torque, the engine (100) engages in the variable operation within a range of comparatively higher rpm through control by the drive interface device (105) controlling the manual operation interface (104) so as to increase rpm or torque; meanwhile, the controllable front-end gearbox (102) is directly subject to control by the manual operation interface (104) or by the active control device (1020) to make the output of relatively variable speed ratio when the output from controllable front-end gearbox (102) reaches a preset rpm or torque; if the system is provided with a rear-end output gearbox (103), the output of relatively variable speed ratio is made by means of controlling the speed ratio of the rear-end gearbox (103);
  (d) engine braking function: wherein, the engine (100) rpm is reduced by the operating the manual operation interface (104) and the drive control interface (105), the clutch (101) is in its closed status, and inertia from a load side is transmitted in reverse back to the engine (100) for the engine (100) to execute braking by internal friction; and
  (e) reverse gear function: wherein the engine (100) runs at or approximately at a fixed speed to operate within the rpm range of better BSFC efficiency, the clutch (101) is in its closed status, and the controllable front-end gearbox (102) engages in reverse drive by operating the manual operation interface (104); the reverse drive is a transmission provided with reverse gear to be disposed at the output end or to the controllable front-end gearbox (102) that is controllable to engage in reverse output.

11. The power system of claim 1, wherein the rear-end output gearbox (1035) consists of a manual gearbox provided with step gearshift function, or a manual step provided with step automatic transmission function, or a gearbox provided with stepless function directly operated by hand to output for driving a load, or driving two loads that engage in differential operation.

12. The power system of claim 11, wherein the power system provides any or all of the following functions:
  stand-by function: wherein the engine (100) may be killed or idling at low rpm, the clutch (101) is in released status; and the controllable front-end gearbox (102) is at its Stop position;
  (b) start→low speed→medium speed drive function: wherein the engine 100 runs at or approximately at a fixed speed to operate within an rpm range of better BSFC efficiency, the clutch (101) is in its closed status, and the controllable front-end gearbox (102) produces output from low rpm accelerated to medium rpm to drive a load through the active control via the manual control interface (104) or indirectly by the drive control interface (105), and further to drive a load through the rear-end output gearbox (1035) comprised of a gearbox provided with manual step gearshift, or manual automatic transmission step gearshift, or manual stepless function;
  (c) medium speed→high speed drive function: wherein if the system is provided with the function of high speed drive output, the engine (100) is accelerated from medium speed up to high speed to drive a load through operation of the manual operation interface (104) and operation of the drive control interface (105), and further to drive a load through the rear-end output gearbox (1035);
  (d) engine braking function: wherein the engine (100) speed is reduced by the operating the manual operation interface (104) and the drive control interface (105), the clutch (101) is in its closed status, and inertia from the load side is transmitted in reverse back to the engine (100) for the engine (100) to execute braking by internal friction; and
  (e) reverse gear function: wherein the engine (100) runs at or approximately at a fixed speed to operate within the rpm range of better BSFC efficiency, the clutch (101) is in its closed status, and the controllable front-end gearbox (102) engages in reverse drive by operating the manual operation interface (104); the reverse operation is a transmission provided with reverse gear to be disposed at the output end or to the controllable front-end gearbox (102) or the rear-end output gearbox (1035) that is controllable to engage in reverse output.

13. The power system of claim 1, wherein:
the rear-end gearbox (1037) consists of a microprocessor controlled or other automatic transmission operated step or stepless gearbox to output for driving a load, or driving two loads that engage in differential operation.

14. The power system of claim 13, wherein the power system provides any or all of the following functions:
- (a) stand-by function: wherein the engine (100) may be killed or idling at low speed, the clutch (101) is in released status; and the controllable front-end gearbox (102) is at its Stop position;
- (b) start→low speed→medium speed drive function: wherein the engine (100) runs at or approximately at a fixed speed to operate within an rpm range of better BSFC efficiency, the clutch (101) is in its closed status, and the controllable front-end gearbox (102) produces output from low rpm accelerated to medium rpm to drive a load through the active control via the manual control interface (104) or indirectly by means of the drive control interface (105); and further to drive a load through the rear-end output gearbox (1037);
- (c) medium speed→high speed drive function: wherein if the system is provided with the function of high speed drive output, the engine (100) is accelerated from medium speed up to high speed to drive a load through the operation of the manual operation interface (104) and the operation of the drive control interface (105), and further to drive a load through the rear-end output gearbox (1037);
- (d) engine braking function: wherein the engine (100) speed is reduced by the operating the manual operation interface (104) and the drive control interface (105), the clutch (101) is in its closed status, and inertia from a load side is transmitted in reverse back to the engine (100) for the engine (100) to execute braking by internal friction; and
- (e) reverse gear function: wherein the engine (100) runs at or approximately at a fixed speed to operate within the rpm range of better BSFC efficiency, the clutch (101) is in its closed status, and the controllable front-end gearbox (102) engages in reverse drive by operating the manual operation interface (104); the reverse operation is provided by a transmission provided with reverse gear to be disposed at the output end or to the controllable front-end gearbox (102) that is controllable to engage in reverse output.

15. The power system of claim 1, wherein
the system is further applied in a multiple output power train to drive a load, the engine drives multiple output power trains that allow active control of gearshift to further drive loads respectively allotted to each output power train; and the system further comprises:
a power allotment device (111);
a second controllable front-end gearbox (102'), whereas the controllable front-end gearbox recited in claim 1 constitutes a first controllable front-end gearbox, and wherein the first and second controllable front-end gearboxes (102), (102') are respectively driven by two output ends of the power allotment device (111);
whereas the active control device recited in claim 1 is a first active control device, a second active control device (1020') related to a physical structure that produces activated displacement when driven by a mechanical structure, electro-mechanical structure, air pressure, hydraulic, coil, vacuum suction, electromagnetic attraction or rejection, or any other control device so as to put under the control by manual, mechanical force, electric signal or photo signal for executing active control of the second controllable front-end gearbox (102') to engage in relative change in transmission ratio;
whereas the rear-end output gearbox recited in claim 1 is a first rear-end output gearbox, a second rear-end output gearbox (103') with fixed transmission ratio, a step gearshift operated by manual, or a step or stepless automatic gearbox, or a step or stepless gearbox of microprocessor controlled automatic gearshift, including gear, friction gear, pulley, sprocket, fluidity, electromagnetic transmission, or any other transmission; and
the output from the second rear-end gearbox (103') may be manually controlled or controlled in automatic transmission by a microprocessor to provide output at higher rpm by changing the transmission ratio from zero-output or a selected output at lower rpm, and its output end is available for driving a load, or driving two loads that may execute differential operation;
the manual operation interface (104) controls the first and second controllable front-end gearboxes (102), (102'), and the first and second rear-end output gearboxes (103), (103') for outputting to drive the load;
the drive control interface (105) controls the first and second active control devices (1020), (1020') of the respective first and second controllable front-end gearboxes (102), (102') to engage in the operation of related mechanism; and
the power allotment device (111): to input from its input end rotary motion transmitted from the engine (100) by the clutch (101), and to output the rotary motion from its both output ends; may be further provided with a clutch function, variable transmission ratio, differential operation between at least two output ends, torque control, or torque limitation to control its incoming and outgoing rotary motion;
said power allotment device (111) may be subject to control by the manual operation interface (104) or the drive control interface (105); one end of both output ends of the power allotment device (111) is provided for transmitting to the first controllable front-end gearbox (102), and further to respectively drive the adapted first rear-end output gearbox (103) from the output end of the first controllable front-end gearbox (102); therefore, the first controllable front-end gearbox (102) is subject to the control by the adapted first active control device (1020), which is either directly subject to the active control by the manual operation interface (104), or indirectly subject to the active control by the drive control interface (105) to execute the active control over the transmission ratio of the first controllable front-end gearbox (102);
another end of both output ends of the power allotment device (111) is provided for transmitting to the second controllable front-end gearbox (102'), and further to respectively drive the adapted second rear-end output gearbox (103') from the output end of the second controllable front-end gearbox (102'); therefore, the second controllable front-end gearbox (102') is subject to the control by the adapted second active control device (1020'), which is either directly subject to the active control by the manual operation interface (104), or indirectly subject to the active control by the drive control interface (105) to execute the active control over the transmission ratio of the second controllable front-end gearbox (102');
as required, two or more than two revolving output ends may be disposed at the output end of the power allotment device (111);
said multiple output power trains may be provided in two or more than two sets for executing multiple-wheel drive, e.g., to drive vehicles with four or more than four wheels, or to drive a tracked vehicle.

16. The power system of claim 15, wherein
the first controllable front-end gearbox (102) of a first power train is disposed between the input end to couple the power allotment device (111) and the output end to drive the first rear-end output gearbox (103), so that when the controllable clutch (201) is closed, the input end is coupled to the power allotment device (111) and the output end to drive the first rear-end gearbox (103) to reduce transmission loss via direct coupling to the transmission by means of the controllable clutch (201) without relying upon the first front-end gearbox (102);

said controllable clutch (201) may be provided inside or outside the first controllable front-end gearbox (102). If the controllable clutch is provided externally to the first controllable front-end gearbox (102), the first gearbox (108) is disposed to provide transmission between the input end of the first controllable front-end gearbox (102) and the input end of the controllable clutch (201); when the externally disposed controllable clutch (201) is closed, the first controllable front-end gearbox (102) executes direct transmission through the controllable clutch (201) between the input end to couple to the power allotment device (111) and the output end to drive the first rear-end output gearbox (103) for promoting the transmission efficiency;

in a second power train, a second controllable clutch (201') is disposed to the second controllable front-end gearbox (102') between the input end to couple the power allotment device (111) and the output end to drive the second rear-end output gearbox (103'); when the second controllable clutch (201') is closed, directly coupled transmission is achieved between the input end to couple the power allotment device (111) and the output end to drive the second rear-end output gearbox (103') for reduction of transmission loss;

said second controllable clutch (201)' may be provided inside or outside the second controllable front-end gearbox (102'); if the second controllable clutch is provided externally to the second controllable front-end gearbox (102'), a third gearbox (108') is disposed to provide the transmission between the input end of the second controllable front-end gearbox (102') and the input end of the clutch (201'); when the externally disposed second controllable clutch (201') is closed, the second controllable front-end gearbox (102') executes direct transmission through the second controllable clutch (201') between the input end to couple to the power allotment device (111) and the output end to drive the second rear-end output gearbox (103') for promoting the transmission efficiency;

two or more than two revolving output ends may be provided at the output end of the power allotment device (111) as required, and the multiple output power train may contain two or more than two power trains to drive multiple wheels, such as drive vehicles with four or more than four wheels, or to drive a tracked vehicle.

17. The power system of claim 16, wherein
the system is applied in power output of multiple output power trains; a motive power side of a power allotment device (111) of the system to drive a controllable clutch (301) and an inertial flywheel (300), in applying a braking, or where the engine (100) is running with comparatively low load of BSFC (Braking Specific Fuel Consumption), the controllable clutch (301) adapted to the flywheel (300) is closed while rotary kinetic energy from the engine (100) drives the flywheel (300) through the motive power side of the power allotment device (111) and the controllable clutch (301) to operate for storage of rotary kinetic energy to increase the load of the engine (100), so that the engine (100) operates in an range with better BSFC; while the engine (100) is running in heavy load operation range in case of start-up or emergency acceleration, the controllable clutch (301) is operated to close, power is released from the flywheel (300) to provide auxiliary drive to help the engine (100) drive the load for achieving energy saving purposes; wherein:

the flywheel (300) comprises a rotary part to execute input and output of free revolution and to input or output the rotary kinetic energy; and its nature as an inertial revolving object makes it being capable of directly accepting the input or output of rotary kinetic energy, or a front-end gearbox (310) containing various speed ratios may be adapted to the flywheel (300) as required;

the controllable clutch (301) comprises a clutching device driven by manual, mechanical, electromagnetic, fluid, or eccentric force, or a one-way transmission disposed between the power allotment device (111) and the flywheel (300); and the front-end gearbox (310) comprises a gear, friction gear, pulley, serrated pulley, sprocket, fluidity, electromagnetic transmission, or any other transmission to provide the revolving kinetics.

18. The power system of claim 16, wherein
the system is applied in power output of multiple output power trains; a motive power side of a power allotment device (111) of the system drives a controllable clutch (301) and a revolving electric machine (302) that operates as a generator or a motor, in applying a braking, or where the engine is running with comparatively low load of BSFC (Braking Specific Fuel Consumption), the controllable clutch (301) is operated to close and the revolving electric machine (302) operates as a generator, and to charge a rechargeable device (304) by means of a control device (303) to increase the load of the engine, so that the engine (100) operates in an range with better BSFC; while the engine (100) is running in heavy load operation range in case of start-up or emergency acceleration, the controllable clutch (301) is operated to close, power is released from the rechargeable device (304) to drive the revolving electric machine (302) to operate as a motor through the control device (303) to help the engine drive the load for achieving energy saving purposes; wherein:

the controllable clutch (301) comprises a clutching device driven by manual, mechanical, electromagnetic, fluid, or eccentric force, or a one-way transmission disposed between the power allotment device (111) and the revolving electric machine (302);

the revolving electric machine (302) comprises an internal or external rotation type of AC or DC, brush or brushless, synchronous or asynchronous revolving electric machine, said revolving electric machine (302), containing magnetic field and a rotor operates as a generator to charge a rechargeable device (304) by the generated power, and operates as a motor by the power from the rechargeable device (304) through control by the control device (303);

the control device (303) comprises a dynamo-electric, electronic, or power type solid status electronic device to control the revolving electric machine (302) to operate as a generator, and to control output voltage, amperage or polarity, or control its frequency or phase sequence when operating in an AC power generation system; and the rechargeable device (304) comprises any rechargeable battery, capacitor, super-capacitor, or fuel cell to recharge or release electric energy.

* * * * *